United States Patent
Perez et al.

(10) Patent No.: US 10,324,424 B2
(45) Date of Patent: *Jun. 18, 2019

(54) CONTROL SYSTEM WITH RESPONSE TIME ESTIMATION AND AUTOMATIC OPERATING PARAMETER ADJUSTMENT

(71) Applicant: Johnson Controls Technology Company, Plymouth, MI (US)

(72) Inventors: Carlos Felipe Alcala Perez, Milwaukee, WI (US); Timothy I. Salsbury, Mequon, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 354 days.

This patent is subject to a terminal disclaimer.

(21) Appl. No.: 15/173,295

(22) Filed: Jun. 3, 2016

(65) Prior Publication Data

US 2016/0282820 A1  Sep. 29, 2016

Related U.S. Application Data

(63) Continuation-in-part of application No. 13/794,683, filed on Mar. 11, 2013, now Pat. No. 9,395,708.

(51) Int. Cl.
  *G05B 13/02* (2006.01)
  *G05B 13/04* (2006.01)
  *G05B 21/02* (2006.01)

(52) U.S. Cl.
  CPC ....... *G05B 13/0255* (2013.01); *G05B 13/047* (2013.01); *G05B 21/02* (2013.01)

(58) Field of Classification Search
  CPC ............. G05B 13/042; G05B 13/047; G05B 13/0255; G05B 21/02
  See application file for complete search history.

(56) References Cited

U.S. PATENT DOCUMENTS

| | | |
|---|---|---|
| 3,763,490 A | 10/1973 | Hadley et al. |
| 3,864,639 A | 2/1975 | Musgrave et al. |
| 4,755,795 A | 7/1988 | Page |
| 5,568,377 A | 10/1996 | Seem et al. |
| 5,977,957 A | 11/1999 | Miller et al. |
| 6,937,909 B2 | 8/2005 | Seem |
| 7,024,336 B2 | 4/2006 | Salsbury et al. |

(Continued)

FOREIGN PATENT DOCUMENTS

WO  WO 2013/007867  1/2013

OTHER PUBLICATIONS

Salsbury et al., Method for Adaptive Adjustment of the Sample Rate in PRAC-PI Controllers, Oct. 12, 2012, 12 pages.

(Continued)

*Primary Examiner* — M. N. Von Buhr
(74) *Attorney, Agent, or Firm* — Foley & Lardner LLP

(57) ABSTRACT

A control system for a plant includes a controller and a sensor. The controller is configured to estimate a response time of the plant and adjust a sampling rate based on the estimated response time. The response time is a parameter that characterizes a response of the plant to a disturbance. The sensor is configured to receive the adjusted sampling rate from the controller, collect samples of a measured variable from the plant at the adjusted sampling rate, and provide the samples of the measured variable to the controller.

19 Claims, 8 Drawing Sheets

(56) References Cited

U.S. PATENT DOCUMENTS

| | | | |
|---|---|---|---|
| 7,289,936 B2 | 10/2007 | Singhal et al. | |
| 7,505,877 B2 | 3/2009 | Salsbury | |
| 7,522,071 B2 | 4/2009 | Caselli et al. | |
| 7,827,813 B2 | 11/2010 | Seem | |
| 8,096,140 B2 | 1/2012 | Seem | |
| 8,446,530 B2 | 5/2013 | Bellers | |
| 8,495,888 B2 | 7/2013 | Seem | |
| 8,620,628 B2 | 12/2013 | Yu et al. | |
| 9,395,708 B2 * | 7/2016 | Perez | G05B 13/042 |
| 2001/0038316 A1 | 11/2001 | Kondoh | |
| 2005/0221514 A1 | 10/2005 | Pasadyn et al. | |
| 2009/0138102 A1 | 5/2009 | Moden | |
| 2010/0204808 A1 | 8/2010 | Thiele | |
| 2012/0170639 A1 | 7/2012 | Salsbury | |
| 2013/0197676 A1 | 8/2013 | Salsbury et al. | |
| 2014/0101420 A1 | 4/2014 | Wu | |
| 2014/0257528 A1 | 9/2014 | Perez et al. | |
| 2014/0359367 A1 | 12/2014 | Friman et al. | |
| 2015/0212498 A1 | 7/2015 | Kawai | |
| 2016/0282820 A1 * | 9/2016 | Perez | G05B 13/047 |

OTHER PUBLICATIONS

Extended Search Report for European Application No. 17171769.7, dated Oct. 30, 2017, 7 pages.

Non-Final Office Action on U.S. Appl. No. 15/173,284 dated Jun. 29, 2018. 8 pages.

Office Action on Japanese Patent Application No. 2017-105175 dated Jul. 31, 2018. 5 pages.

\* cited by examiner

CONTROL SYSTEM WITH RESPONSE TIME ESTIMATION AND AUTOMATIC OPERATING PARAMETER ADJUSTMENT

CROSS-REFERENCE TO RELATED PATENT APPLICATION

This application is a continuation-in-part of U.S. patent application Ser. No. 13/794,683 filed Mar. 11, 2013, now U.S. Pat. No. 9,395,708, the entire disclosure of which is incorporated by reference herein.

BACKGROUND

The present disclosure relates generally to the field of feedback controllers. The present disclosure relates more specifically to systems and methods for determining an appropriate sampling rate for a feedback controller.

Feedback controllers are used to control a wide variety of systems and processes. Typically, a feedback controller receives a measured value of a controlled variable (e.g., a feedback signal) and adjusts an input provided to a control device based on the measured value. The object of feedback controllers is to adjust the input provided to the device in a way that maintains a controlled variable at a desired setpoint.

Many feedback controllers respond to a feedback signal based on one or more control parameters. One control parameter frequently used in feedback control processes is a proportional gain (i.e., the proportional term, the gain, etc.). Feedback controllers typically apply the proportional gain as a multiplier to an error signal (e.g., a difference between a setpoint and a feedback signal) in determining an input to provide to the controlled system or process. In addition to the proportional gain, feedback controllers can use other control parameters such as an integral term (e.g., in a proportional-integral (PI) controller) and/or a derivative term (e.g., in a proportional-integral-derivative (PID) controller, etc.).

For dynamic systems in which conditions outside of the control loop affect the controlled variable or where an aspect of the control loop is variably imperfect, the optimal control parameters may also be dynamic. Accordingly, some feedback controllers automatically adjust the control parameters (e.g., the controller is "tuned") based on observed behavior of the system. Some feedback controllers include adaptive tuning algorithms that automatically adjust the control parameters during normal operation. Such adaptive tuning algorithms can provide for improved performance relative to other tuning strategies.

The rate at which measurements are collected from the controlled system or process (e.g., the sampling rate) can affect the operation of an adaptive tuning algorithm. If the sampling rate is too fast, the feedback controller may tune improperly and the proportional gain may be too small. If the sampling rate is too slow, the performance of the feedback controller may suffer. It is often challenging to determine an appropriate sampling rate for a feedback control system.

SUMMARY

One implementation of the present disclosure is a control system for a plant. The control system includes a controller and a sensor. The controller is configured to estimate a response time of the plant and adjust a sampling rate based on the estimated response time. The response time is a parameter that characterizes a response of the plant to a disturbance. The sensor is configured to receive the adjusted sampling rate from the controller, collect samples of a measured variable from the plant at the adjusted sampling rate, and provide the samples of the measured variable to the controller.

In some embodiments, the controller is configured to use the samples of the measured variable to generate and provide an input to the plant. In some embodiments, the response time includes at least one of a dominant time constant, a bandwidth, and an open loop response time of the plant.

In some embodiments, the controller is configured to detect the disturbance in the control system and evaluate a signal affected by the disturbance to estimate the response time of the plant. In some embodiments, the controller is configured to use the adjusted sampling rate to generate samples of the signal affected by the disturbance.

In some embodiments, the signal affected by the disturbance includes at least one of the measured variable and a function of the measured variable. In some embodiments, the signal affected by the disturbance includes at least one of an input provided to the plant and a function of the input provided to the plant.

Another implementation of the present disclosure is a method for monitoring and controlling a plant. The method includes estimating a response time of the plant. The response time is a parameter that characterizes a response of the plant to a disturbance. The method further includes adjusting a sampling rate based on the estimated response time, collecting samples of a measured variable from the plant at the adjusted sampling rate, and using the samples of the measured variable to generate and provide an input to the plant.

In some embodiments, the method includes detecting the disturbance in a control system for the plant and evaluating a signal affected by the disturbance to estimate the response time of the plant. In some embodiments, the signal affected by the disturbance includes at least one of the measured variable and a function of the measured variable. In some embodiments, the signal affected by the disturbance includes at least one of the input provided to the plant and a function of the input provided to the plant.

In some embodiments, the method includes using the adjusted sampling rate to generate samples of the signal affected by the disturbance. In some embodiments, the response time includes at least one of a dominant time constant, a bandwidth, and an open loop response time of the plant.

Another implementation of the present disclosure is a control system for a plant. The control system includes a disturbance detector configured to detect a disturbance in the control system and a response time estimator configured to evaluate a signal affected by the disturbance to estimate a response time of a plant. The response time is a parameter that characterizes a response of the plant to the disturbance. The system includes a fault detector configured to detect a fault in the control system based on the estimated response time of the plant and an adaptive controller configured to generate and provide an input to the plant.

In some embodiments, the fault detector is configured to detect the fault by comparing the estimated response time to a previous response time for the plant and determining that a fault has occurred in response to the estimated response time deviating from the previous response time by a predetermined amount.

In some embodiments, the system includes an operating parameter calculator configured to adjust an operating parameter used by the adaptive controller based on the estimated response time. In some embodiments, adjusted operating parameter includes at least one of a controller gain and an integral time. In some embodiments, the response time includes at least one of a dominant time constant, a bandwidth, and an open loop response time of the plant.

In some embodiments, the system includes a sampling rate adjustor configured to adjust a sampling rate based on the estimated response time. In some embodiments, the system includes a sensor configured to collect samples of a measured variable from the plant at the adjusted sampling rate and provide the samples of the measured variable to the adaptive controller.

DETAILED DESCRIPTION

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limited.

Overview

Referring generally to the figures, systems and methods for adaptively adjusting a sampling rate in a feedback control system are shown, according to various exemplary embodiments. The systems and methods described herein automatically estimate a time constant for a controlled process or system and automatically set the sampling rate based on the estimated time constant. The time constant is estimated by analyzing an error signal (e.g., a difference between a setpoint and a feedback signal received from the controlled system).

Estimating the time constant includes determining whether the system is subject to a setpoint change or a load disturbance. If the system is subject to a setpoint change, the time constant is estimated by integrating the error signal (e.g., numerically, analytically, etc.) to determine an area under the error curve. The area under the error curve may be divided by the magnitude of the setpoint change to determine the estimated time constant. If the system is subject to a load disturbance, the time constant may be estimated by determining a time at which the error signal reaches an extremum (e.g., a minimum or a maximum) in response to the load disturbance. The time value at which the load disturbance begins may be subtracted from the time value at which the error signal reaches the extremum to determine the estimated time constant. The estimated time constant may be used to automatically and adaptively set the sampling rate for the feedback control system, without manual observation or adjustment.

The systems and methods described herein may be incorporated into an existing feedback controller (e.g., a proportional-integral (PI) controller, a proportional-integral-derivative (PID) controller, a pattern recognition adaptive controller (PRAC), etc.) or supplement an existing feedback control system. Advantageously, the adaptively determined sampling rate may improve the adaptive feedback controller's performance in determining optimal control parameters (e.g., a proportional gain, an integral time, etc.) for the controlled process or system.

Control Systems

Figure 1:
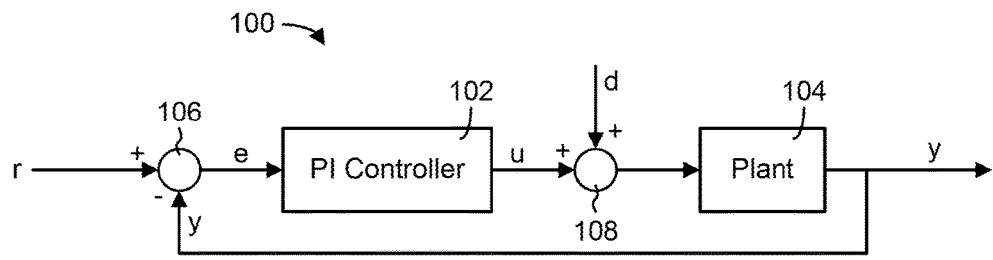
FIG. 1 is a block diagram of a closed-loop control system including a proportional integral (PI) controller and a plant, illustrating the application of a setpoint r and a load disturbance d to the closed-loop system, according to an exemplary embodiment.

Referring now to FIG. 1, a block diagram of a closed-loop control system 100 is shown, according to an exemplary embodiment. System 100 may be a building management system or part of a building management system (e.g., a HVAC control system, a lighting control system, a power control system, a security system, etc.). System 100 may be a local or distributed control system used to control a single building, a system of buildings, one or more zones within a building. In some implementations, system 100 may be a METASYS® brand control system as sold by Johnson Controls, Inc. System 100 is shown to include a PI controller 102, a plant 104, a subtractor element 106, and a summation element 108.

Plant 104 may be a system or process monitored and controlled by closed-loop system 100 (e.g., a control process). Plant 104 may be a dynamic system (e.g., a building, a system of buildings, a zone within a building, etc.) including one or more variable input devices (e.g., dampers, air handling units, chillers, boilers, actuators, motors, etc.) and one or more measurement devices (e.g., temperature sensors, pressure sensors, voltage sensors, flow rate sensors, humidity sensors, etc.). In some implementations, plant 104 may be a zone within a building (e.g., a room, a floor, an area, etc.) and control system 100 may be used to control temperature within the zone. For example, control system 100 may actively adjust a damper position in a HVAC unit (e.g., an air handling unit (AHU), a variable air volume (VAV) box, etc.) for increasing or decreasing the flow of conditioned air (e.g., heated, chilled, humidified, etc.) into the building zone.

Plant 104 may receive an input from summation element 108 which combines a control signal u with a disturbance signal d. In some embodiments, plant 104 may be modeled as a first-order plant having a transfer function $$G_p(s) = \frac{K_p}{1 + \tau_p s} e^{-Ls},$$

where $\tau_p$ is the dominant time constant, L is the time delay, and $K_p$ is the process gain. In other embodiments, plant 104 may be modeled as a second-order, third-order, or higher order plant. Plant 104 may produce a feedback signal y in response to control signal u and disturbance signal d. Feedback signal y may be subtracted from setpoint r at subtractor element 106 to produce an error signal e (e.g., e=r−y).

PI controller 102 is shown receiving error signal e from subtractor element 106. PI controller 102 may produce a control signal u in response to the error signal e. In some embodiments, controller 102 is a proportional-integral controller. PI controller 102 may have a transfer function $$G_c(s) = \frac{K_c(1 + T_i s)}{T_i s},$$

where $K_c$ is the controller gain and $T_i$ is the integral time. Controller gain $K_c$ and integral time $T_i$ are the control parameters which define the response of PI controller 102 to error signal e. That is, controller gain $K_c$ and integral time $T_i$ control how PI controller 102 translates error signal e into control signal u. In some embodiments, $K_c$ and $T_i$ are the only control parameters. In other embodiments, different control parameters (e.g., a derivative control parameter, etc.) may be used in addition to or in place of control parameters $K_c$ and $T_i$.

Still referring to FIG. 1, in the Laplace domain, the error signal e(s) may be expressed in terms of the setpoint r(s) as $e(s) = r(s) \frac{1}{1 + G_c(s) G_p(s)}$.

Error signal e(s) may be expressed in terms of the disturbance signal d(s) as $$e(s) = -d(s) G_p(s) \frac{1}{1 + G_c(s) G_p(s)}.$$

The common term in both expressions for the error signal may be rewritten as $$\frac{1}{1 + G_c(s) G_p(s)} = \frac{1}{1 + \frac{(K_p K_c)(1 + T_i s)}{T_i s(1 + \tau_p s)} e^{-Ls}}.$$

This expression can be simplified by assuming that $K_p K_c \approx 1$ and that $T_i \approx \tau_p$. The simplified closed-loop transfer function may then be expressed as $$\frac{1}{1 + G_c(s) G_p(s)} = \frac{\tau_p s}{\tau_p s + e^{-Ls}}.$$

Figure 2:
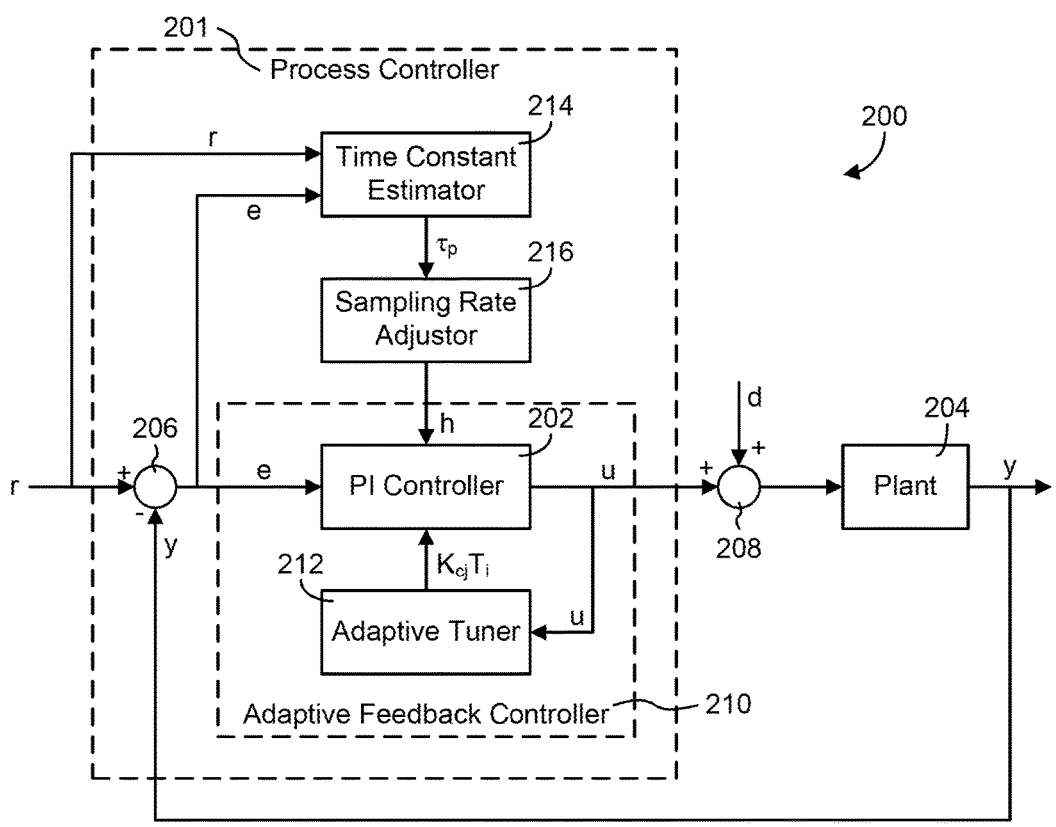
FIG. 2 is a block diagram of an adaptive feedback control system including an adaptive feedback controller, a time constant estimator configured to estimate a time constant $\tau_p$ for the plant based on an error signal e, and a sampling rate adjustor configured to determine a sampling rate h for the adaptive feedback controller based on the estimated time constant $\tau_p$, according to an exemplary embodiment.

Referring now to FIG. 2, a block diagram of a closed-loop system 200 is shown, according to an exemplary embodiment. System 200 is shown to include a process controller 201 having an adaptive feedback controller 210, a time constant estimator 214, and a sampling rate adjustor 216. Adaptive feedback controller 210 may be a pattern recognition adaptive controller (PRAC), a model recognition adaptive controller (MRAC), or any other type of adaptive tuning or feedback controller. PRAC controllers are described in greater detail in U.S. Pat. Nos. 5,355,305, 5,506,768, and 6,937,909, as well as other resources.

Adaptive feedback controller 210 may include a proportional-integral (PI) controller, a proportional-derivative (PD) controller, a proportional-integral-derivative (PID) controller, or any other type of controller which generates a control signal in response to a feedback signal, an error signal, and/or a setpoint. Adaptive feedback controller 210 may be any type of feedback controller (e.g., PRAC, MRAC, PI, etc.) which adaptively adjusts one or more controller parameters (e.g., a proportional gain, an integral time, etc.) used to generate the control signal. Adaptive feedback controller 210 is shown to include a PI controller 202 and an adaptive tuner 212.

PI controller 202 may be the same or similar to PI controller 102 described in reference to FIG. 1. For example, PI controller 202 may be a proportional-integral controller having a transfer function $$G_c(s) = \frac{K_c(1 + T_i s)}{T_i s}.$$

PI controller 202 may receive an error signal e from subtractor element 206 and provide a control signal u to summation element 208. Summation element 208 may combine control signal u with a disturbance signal d and provide the combined signal to plant 204. Elements 206, 208, and plant 204 may be the same or similar to elements 106, 108, and plant 104 as described in reference to FIG. 1.

Adaptive tuner 212 may periodically adjust (e.g., calibrate, tune, update, etc.) the control parameters used by PI controller 202 in translating error signal e into control signal u. The control parameters determined by adaptive tuner 212 may include a controller gain $K_c$ and an integral time $T_i$. Adaptive tuner 212 may receive control signal u from PI controller 202 and adaptively determine control parameters $K_c$ and $T_i$ based on control signal u (e.g., as described in the aforementioned U.S. patents). Adaptive tuner 212 provides the control parameters $K_c$ and $T_i$ to PI controller 202.

Still referring to FIG. 2, system 200 is further shown to include a time constant estimator 214. Time constant estimator 214 determines a dominant time constant $\tau_p$ for plant 204. The estimated time constant $\tau_p$ is then used by sampling rate adjustor 216 to adaptively determine an appropriate sampling rate h for PI controller 202. Time constant $\tau_p$ may also be used to predict the response of plant 204 to a given control signal u. Time constant estimator 214 is shown receiving setpoint r as well as error signal e. In other embodiments, time constant estimator 214 may receive only error signal e or may calculate error signal e based on setpoint r and feedback signal y (e.g., e=r−y). Time constant estimator 214 may determine the dominant time constant $\tau_p$ based on error signal e, setpoint r, and/or other inputs received from various components of control system 200. In some embodiments, time constant estimator 214 may estimate a time constant based on control signal u (e.g., in a feed forward, model predictive control, and/or open loop control system). In some embodiments, control signal u may be used in place of or in addition to error signal e in estimating a time constant.

The process used to estimate time constant $\tau_p$ may depend on whether system 200 is subject to a setpoint change or a load disturbance. A setpoint change is an increase or decrease in setpoint r. A setpoint change may be instantaneous (e.g., a sudden change from a first setpoint value to a second setpoint value) or gradual (e.g., a ramp increase or decrease, etc.). A setpoint change may be initiated by a user (e.g., adjusting a temperature setting on a thermostat) or received from another controller or process (e.g., a supervisory controller, an outer loop cascaded controller, etc.).

If system 200 is subject to a setpoint change, time constant estimator 214 may estimate time constant τp by integrating the error signal e (e.g., numerically, analytically, etc.) to determine an area A under the error curve. Time constant estimator 214 may then divide the area under the error curve A by a magnitude of the setpoint change a to determine the estimated time constant $$\tau_p \left( e.g., \tau_p = \frac{A}{a} \right).$$

A load disturbance is an uncontrolled input applied to plant 204. For example, in a temperature control system for a building, the load disturbance may include heat transferred through the external walls of the building or through an open door (e.g., during a particularly hot or cold day). The load disturbance may be measured or unmeasured. In some embodiments, time constant estimator 214 receives a signal (e.g., a status indicator, a process output, etc.) from adaptive feedback controller 210 indicating whether system 200 is subject to a setpoint change or a load disturbance. In other embodiments, time constant estimator 214 determines whether a setpoint change or load disturbance has occurred by analyzing the error signal e and/or setpoint r.

If system 200 is subject to a load disturbance, time constant estimator 214 may estimate the time constant τp by determining a time $t_{ex}$ at which the error signal e reaches an extremum (e.g., a minimum or a maximum) in response to the load disturbance. Time constant estimator 214 may subtract a time at which the load disturbance begins $t_d$ from the time at which error signal e reaches an extremum $t_{ex}$ in response to the load disturbance to determine the estimated time constant $\tau_p$ (e.g., $\tau_p = t_{ex} - t_d$). The systems and methods used to estimate the time constant $\tau_p$ in response to a setpoint change and load disturbance are described in greater detail in reference to FIG. 3 and FIG. 4 respectively.

In some embodiments, time constant estimator 214 determines time constant $\tau_p$ in response to an identified load disturbance or setpoint change. Advantageously, time constant estimator 214 may determine time constant $\tau_p$ in real time (e.g., immediately after sufficient data has been collected to perform the aforementioned calculations). For example, time constant estimator 214 may monitor error signal e for a sign change (e.g., positive to negative, negative to positive, zero crossings, etc.). Upon the occurrence of a load disturbance or setpoint change, the error signal e may experience a "zero crossing" and increase or decrease until reaching an extremum. PI controller 202 may attempt to reduce the magnitude of error signal e by manipulating control input u. Upon reaching a steady-state, error signal e may experience another "zero crossing" as the error signal e approaches and/or crosses zero. Time constant estimator 214 may use the zero crossings as time boundaries for calculating the area under error signal e or for calculating a time difference between $t_d$ and $t_{ex}$.

In other embodiments, time constant estimator may determine $\tau_p$ using historical disturbance data. In some embodiments, time constant estimator 214 is local to the controlled process or system for which the time constant $\tau_p$ is estimated. In other embodiments, time constant estimator may be implemented remotely (e.g., in the "cloud," on a supervisory level, etc.). Time constant estimator 214 may be part of PI controller 202, adaptive tuner 212, or implemented separately from such components.

In some embodiments, time constant estimator 214 determines whether a disturbance (e.g., a load disturbance or setpoint change) exceeds a significance threshold before proceeding with the time constant estimation process. For example, time constant estimator 214 may compare a magnitude of the error signal e in response to the disturbance with a threshold value. The magnitude of the error signal e may be a maximum or minimum magnitude after the occurrence of a disturbance. In some embodiments, the threshold value is a noise threshold (e.g., an upper noise threshold, a lower noise threshold, a noise band, etc.). The threshold value may be pre-defined (e.g., retrieved from memory, specified by a user, etc.) or automatically determined based on steady-state measurements obtained from the controlled system or process. In other embodiments, the threshold value is an area threshold (e.g., an area under the error curve), a time threshold, or a combination thereof. For example, time constant estimator 214 may compare the area under the error curve in response to a disturbance with a threshold area value. If the integrated area exceeds the threshold value, time constant estimator 214 may determine that the disturbance is significant. Time constant estimator 214 may proceed with the time constant estimation process if a disturbance is determined to be significant. In some embodiments, time constant estimator 214 does not proceed to estimate the time constant $\tau_p$ if a disturbance is not determined to be significant. In other embodiments, time constant estimator 214 does not determine the significance of disturbances and/or estimates $\tau_p$ regardless of a determined significance.

Still referring to FIG. 2, system 200 is further shown to include a sampling rate adjustor 216. Sampling rate adjustor 216 may receive the estimated time constant $\tau_p$ from time constant estimator 214 and calculate a sampling rate h based on the estimated time constant $\tau_p$. In some embodiments, sampling rate h defines a sampling interval or sampling frequency used by PI controller 202 to obtain feedback measurements from the controlled system or process (e.g., plant 204). In other embodiments, sampling rate h defines a rate at which the control signal u is adjusted by PI controller 202. In further embodiments, sampling rate h defines a rate at which control parameters $K_c$ and $T_i$ are updated by adaptive tuner 212.

In some embodiments, sampling rate adjustor 216 may set sampling rate h to a value between one-fiftieth of the estimated time constant $\tau_p$ and the estimated time constant $$\tau_p \left( \text{e.g., } \frac{\tau_p}{50} \leq h \leq \tau_p \right).$$

In more specific embodiments, the sampling rate h may be set to a value between one-fortieth of the estimated time constant $\tau_p$ and the estimated time constant $$\tau_p \left( \text{e.g., } \frac{\tau_p}{40} \leq h \leq \tau_p \right).$$

In some embodiments, the sampling rate h may be set to a value between one-twentieth of the estimated time constant $\tau_p$ and one-third of the estimated time constant $$\tau_p \left( \text{e.g., } \frac{\tau_p}{50} \leq h \leq \frac{\tau_p}{3} \right).$$

In an exemplary embodiment, the sampling rate h may be set to a value approximately equal to one-tenth of the estimated time constant $$\tau_p \left( \text{e.g., } h \approx \frac{\tau_p}{10} \right).$$

In some embodiments, sampling rate adjustor 216 may be combined with time constant estimator 214, PI controller 202, or adaptive tuner 212.

In some embodiments, sampling rate adjustor 216 compares the calculated sampling rate h with a current or previous sampling rate $h_0$. If the calculated sampling rate h differs significantly from $h_0$, the sampling rate may be updated to the recently calculated value h. In some embodiments, the current sampling rate $h_0$ is updated to the new sampling rate h if the new sampling rate h is greater than or equal to twice the current sampling rate (e.g., $h \geq 2 h_0$). In other embodiments, the current sampling rate $h_0$ is updated to the new sampling rate h if the new sampling rate h is less than half the current sampling rate (e.g., $h \leq 0.5 h_0$). In further embodiments, sampling rate adjustor 216 may update the current sampling rate $h_0$ if the difference between the current sampling rate $h_0$ and the calculated sampling rate h exceeds a difference threshold (e.g., $|h_0 - h| >$ threshold) or if the ratio between $h_0$ and h exceeds a ratio threshold $$\left( \text{e.g., } \frac{h_0}{h} > \text{threshold} \right).$$

The updated sampling rate h may be communicated to adaptive feedback controller 210.

Advantageously, a properly set sampling rate h (e.g., a sampling rate which is a function of the process time constant $\tau_p$), may provide improved stability and control functionality for adaptive feedback controller 210. Adaptively and automatically determining sampling rate h may eliminate the need for human intervention (e.g., a trial and error approach or a rough estimation of the proper sampling rate) to properly configure a wide variety of control systems.

Response Time Graphs

Figure 3:
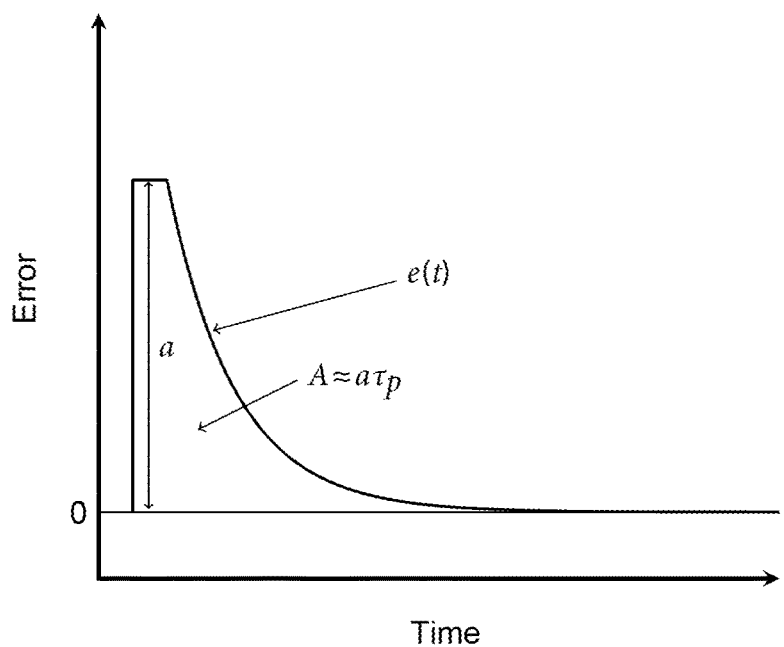
FIG. 3 is a graph of the error signal e used by the adaptive feedback control system of FIG. 2 in response to a step change in the setpoint r, according to an exemplary embodiment.

Referring now to FIG. 3, a graph 300 illustrating the time response of error signal e to a change in setpoint r is shown, according to an exemplary embodiment. Graph 300 shows error signal e as a function of time in response to an step increase of magnitude a in setpoint r. In some embodiments, the output y of plant 204 is a continuous variable unable to instantaneously increase or decrease. Because the error signal e is defined as the difference between setpoint r and output y (e.g., e=r−y), the error signal e may suddenly increase from a first value (e.g., e=0) immediately before the setpoint change to a second value immediately after the setpoint change. The second value may equal the magnitude a of the setpoint change. PI controller 202 may respond to the increase in error signal e by adjusting the control signal u applied to plant 204. Such adjustment may cause error signal e to continuously decrease from the magnitude a of the setpoint change to a steady state value (e.g., e=0).

Still referring to FIG. 3, time constant estimator 214 may estimate the time constant $\tau_p$ for plant 204 based on the response of error signal e to a step change in setpoint r. As was previously mentioned, in the Laplace domain the error signal e(s) may be expressed in terms of the setpoint $$r(s) \text{ as } e(s) = r(s) \frac{1}{1 + G_c(s) G_p(s)}, \text{ where}$$

$$\frac{1}{1 + G_c(s) G_p(s)} = \frac{\tau_p s}{\tau_p s + e^{-Ls}}.$$

A step change of magnitude a in the setpoint produces the error signal $$e(s) = \frac{a \tau_p}{\tau_p s + e^{-Ls}}.$$

The area under the error curve in graph 300 may be determined by integrating the error signal $$e(s) \left( \text{e.g., } I(s) = \frac{1}{s} e(s) \right).$$

In a stable system, the area A under the curve can be expressed as the difference in the areas at $t=\infty$ and $t=0$. That is, $$A = \lim_{s \to 0}\{sI(s)\} - \lim_{s \to \infty}\{sI(s)\} = a\tau_p.$$

From this expression, it is apparent that the time constant $\tau_p$ depends only on the magnitude a of the setpoint change and the area A under the error curve.

Time constant estimator 214 may track the area A under the error curve in response to a setpoint change and estimate the time constant $\tau_p$ according to the equation $$\tau_p = \frac{A}{a}.$$

The area A under the error curve may be tracked by multiplying the magnitude of the error signal e at each time step k by the duration of an interval between time steps $$\left(\text{e.g., } A = \sum_{k=1}^{n} e_k(t) \cdot \Delta t_k\right).$$

In some embodiments, the magnitude a of the setpoint change may be estimated based on the magnitude of the error signal e immediately after the setpoint change. In other embodiments, the magnitude a of the setpoint change may be determined by analyzing setpoint r or may be received as an input from adaptive feedback controller 210.

Still referring to FIG. 3, in some embodiments, time constant estimator 214 determines a time delay L for the controlled system or process (e.g. plant 204). The time delay L may represent an interval between the time at which an input is applied to a controlled system and the time at which the input begins to take effect. Time constant estimator 214 may determine time delay L by analyzing the response of error signal e to a setpoint change. For example, graph 300 shows the error signal e instantaneously changing to the magnitude a of the setpoint change immediately after the setpoint change occurs. The error signal e may maintain this value until after time delay L has passed and the dynamics of the system begin to take effect. Time constant estimator 214 may estimate the time delay L by subtracting a time at which the setpoint change occurs from the time at which the magnitude of the error signal e begins to decrease (e.g., in response to an adjusted control input u). In some embodiments, time constant $\tau_p$ and time delay L may be separately determined. In other embodiments, time constant $\tau_p$ and time delay L may be combined into a single variable (e.g., an average residence time, a dominant time constant, etc.).

Figure 4:
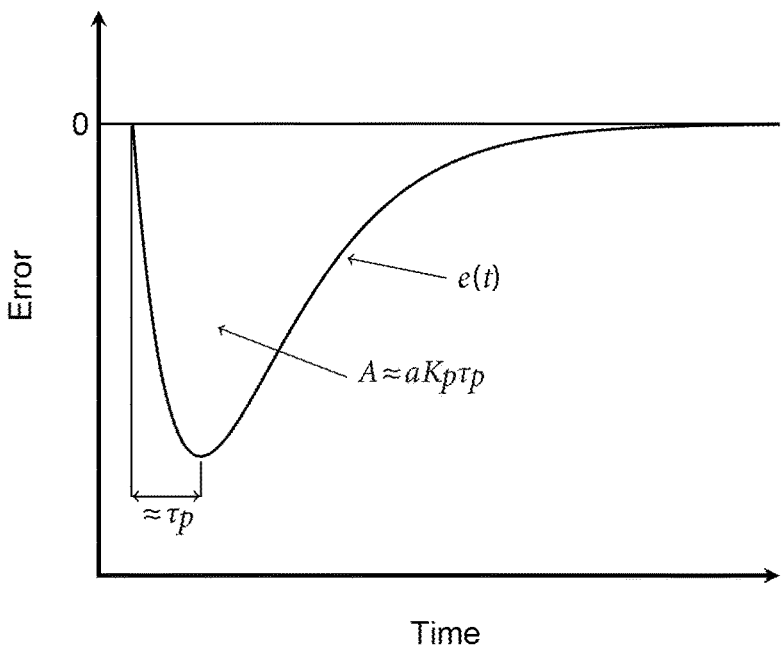
FIG. 4 is a graph of the error signal e used by the adaptive feedback control system of FIG. 2 in response to a step change in the load disturbance d, according to an exemplary embodiment.

Referring now to FIG. 4, a graph 400 illustrating the time response of error signal e to a load disturbance is shown, according to an exemplary embodiment. The load disturbance may be applied to plant 204 as an uncontrolled and/or unmeasured input. The load disturbance may cause a change in the output y received from plant 204 and consequently in error signal e (e.g., e=r−y). In some embodiments, the output y of plant 204 is a continuous variable unable to instantaneously increase or decrease. If the setpoint r is held constant, a load disturbance may cause a continuous increase or decrease in the error signal e (e.g., rather than the instantaneous increase or decrease caused by a setpoint change). Graph 400 shows the error signal e continuously decreasing in response to a load disturbance. The error signal e is shown decreasing from an initial value (e.g. e=0) to a minimum value $e_{min}$. In other embodiments, the load disturbance may cause an increase in the error signal from an initial value (e.g., e=0) to a maximum value $e_{max}$.

In the Laplace domain, the response of the error signal e to a step change of magnitude a in the load disturbance may be represented by the equation $$e(s) = \frac{aK_p\tau_p}{(\tau_p s + 1)(\tau_p s + e^{-Ls})} e^{-Ls},$$

where $K_p$ is the process gain and L is the time delay of the controlled system or process (e.g., plant 204). When a load disturbance occurs, the dynamics of the system do not begin to affect the error signal e until after the time delay L. Accordingly, the time delay L may be neglected and the response of the error signal e to a step change of magnitude a in the load disturbance may be represented by the equation $$e(s) = \frac{aK_p\tau_p}{(\tau_p s + 1)^2}.$$

In the time domain, the error signal e may be expressed as $$e(t) = aK_p\tau_p t e^{\frac{-t}{\tau_p}}.$$

The derivative of this expression is $$\dot{e}(t) = aK_p\tau_p t e^{\frac{-t}{\tau_p}} \left[1 - \frac{t}{\tau_p}\right].$$

An extremum (e.g., a maximum or minimum) of the error signal is found at time $t_{ex}$ when $\dot{e}(t)=0$. The extremum of the error signal e in response to a load disturbance may occur at a time approximately equal to the time constant $\tau_p$ after the disturbance has taken effect. Time constant estimator 214 may determine time constant $\tau_p$ by subtracting a time at which the magnitude of error signal e begins to increase $t_d$ in response to a load disturbance from a time at which error signal e reaches an extremum $t_{ex}$ in response to the load disturbance (e.g., $\tau_p = t_{ex} - t_d$).

Performance Graphs

Referring now to FIGS. 5A-5D, a series of graphs illustrating the expected advantages of adaptively updating sampling rate h are shown, according to an exemplary embodiment. In FIGS. 5A-5D, a simulated first order plant is provided with a control signal u determined by three different types of controllers–a proportional integral (PI) controller having optimal controller parameters ($PI_{opt}$), a pattern recognition adaptive controller (PRAC) having a fixed sampling rate h ($PRAC_{fixed}$), and a PRAC with an adaptively adjusted sampling rate h (e.g., using the systems and methods described in reference to FIGS. 2-4) ($PRAC_{adaptive}$).

Figure 5A:
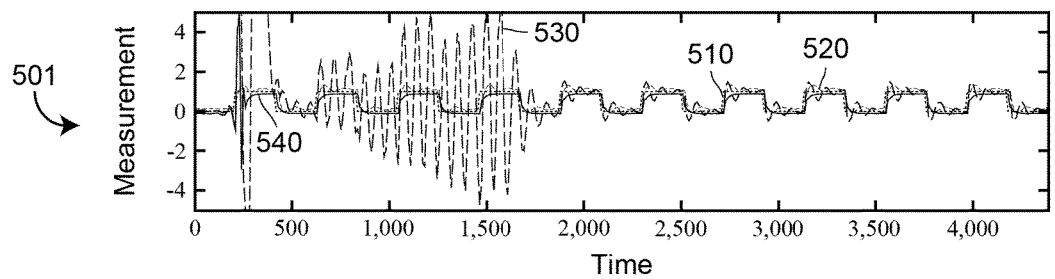
FIG. 5A is a graph of a feedback signal obtained from a controlled process as a function of time for several closed-loop control systems, illustrating the expected performance advantages of the adaptive feedback control system of FIG. 2, according to an exemplary embodiment.

Referring specifically to FIG. 5A, a graph 501 is shown illustrating the resultant measured variable y as a function of time when the simulated plant is independently subjected to a series of setpoint changes and load disturbances. The setpoint r is shown by line 510 and the performance of $PI_{opt}$, $PRAC_{fixed}$, and $PRAC_{adaptive}$ are shown by lines 520, 530, and 540 respectively. As can be seen from FIG. 5A, PRA- $C_{adaptive}$ (line 540) demonstrates a superior ability to track setpoint r (e.g., control the measured variable y to equal the setpoint) when compared with $PRAC_{fixed}$ (line 530). The performance of $PRAC_{adaptive}$ may even exceed the performance of $PI_{opt}$ (line 520).

Figure 5B:
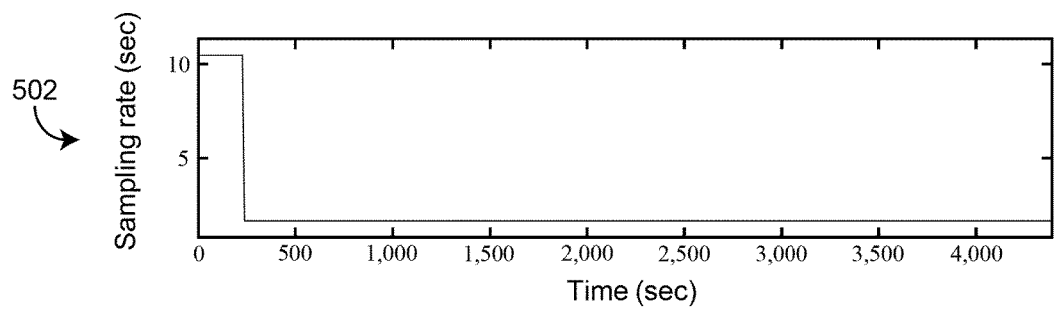
FIG. 5B is a graph of the sampling rate as a function of time as may be determined and used by the sampling rate adjustor of FIG. 2, according to an exemplary embodiment.

Referring to FIG. 5B, a graph 502 is shown illustrating the sampling rate h as a function of time for $PRAC_{adaptive}$. The sampling rate h is shown starting at a first value at t=0. At approximately t=250 seconds, the sampling rate h is adjusted to a lower value. Referring again to FIG. 5A, at approximately this same time (e.g., t≈250 seconds), the performance of $PRAC_{adaptive}$ significantly improves. Notably, $PRAC_{adaptive}$ is shown to adjust the sampling rate h only once throughout the simulation. The single sampling rate adjustment may suggest that time constant $\tau_p$ estimation (e.g., as described in reference to time constant estimator 214) and subsequent sampling rate adjustment (e.g., by sampling rate adjustor 216) accurately capture the true time constant $\tau_p$ of the simulated plant.

Figure 5C:
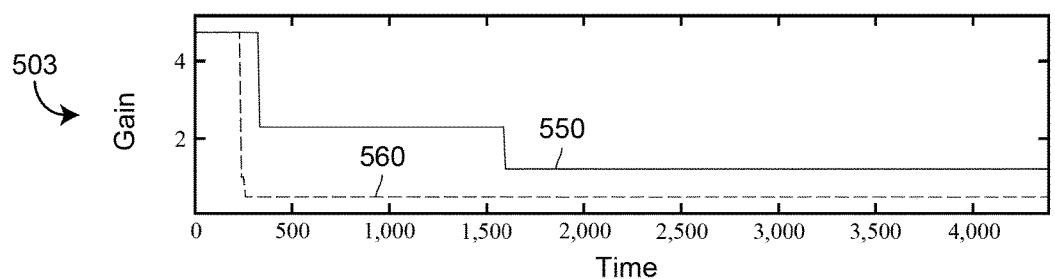
FIG. 5C is a graph of the controller gain parameter over time as may be determined and used by the adaptive feedback controller of FIG. 2 having an adaptively updated sampling rate, as well as the controller gain parameter determined by an adaptive feedback controller with a fixed sampling rate, illustrating the expected performance advantage of adaptively updating the sampling rate, according to an exemplary embodiment.
Figure 5D:
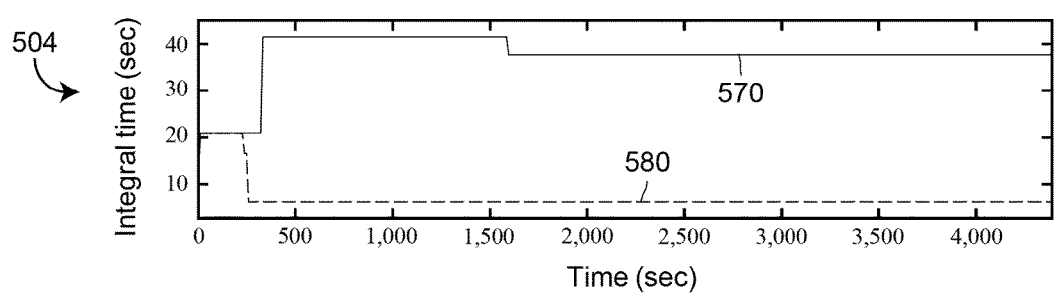
FIG. 5D is a graph of the integral time parameter over time as may be determined and used by the adaptive feedback controller of FIG. 2 having an adaptively updated sampling rate, as well as the integral time parameter determined by an adaptive feedback controller with a fixed sampling rate, illustrating a performance advantage of adaptively updating the sampling rate, according to an exemplary embodiment.

Referring to FIGS. 5C and 5D, graphs 503 and 504 are shown illustrating the controller gain parameter $K_c$ and integral time parameter $T_i$ (e.g., determined by adaptive tuner 212) as a function of time for $PRAC_{fixed}$ and for $PRAC_{adaptive}$. In FIG. 5C, line 550 illustrates the controller gain parameter $K_c$ for $PRAC_{fixed}$ and line 560 illustrates the gain parameter $K_c$ for $PRAC_{adaptive}$. In FIG. 5D, line 570 illustrates the integral time parameter $T_i$ for $PRAC_{fixed}$ and line 580 illustrates the integral time parameter $T_i$ for $PRAC_{adaptive}$. At approximately t=250 seconds (i.e., the same time that the sampling rate h is adjusted), $PRAC_{adaptive}$ compensates by adjusting the controller gain $K_c$ from an initial value to a lower value and by adjusting the integral time $T_i$ from an initial value to a lower value. Notably, $PRAC_{adaptive}$ is shown to adjust the controller gain $K_c$ and integral time $T_i$ only one time throughout the simulation. This single adjustment may suggest that once the sampling rate h is properly set, $PRAC_{adaptive}$ can accurately determine the appropriate controller gain $K_c$ and integral time $T_i$ without requiring subsequent correction.

Process Controller

Figure 6:
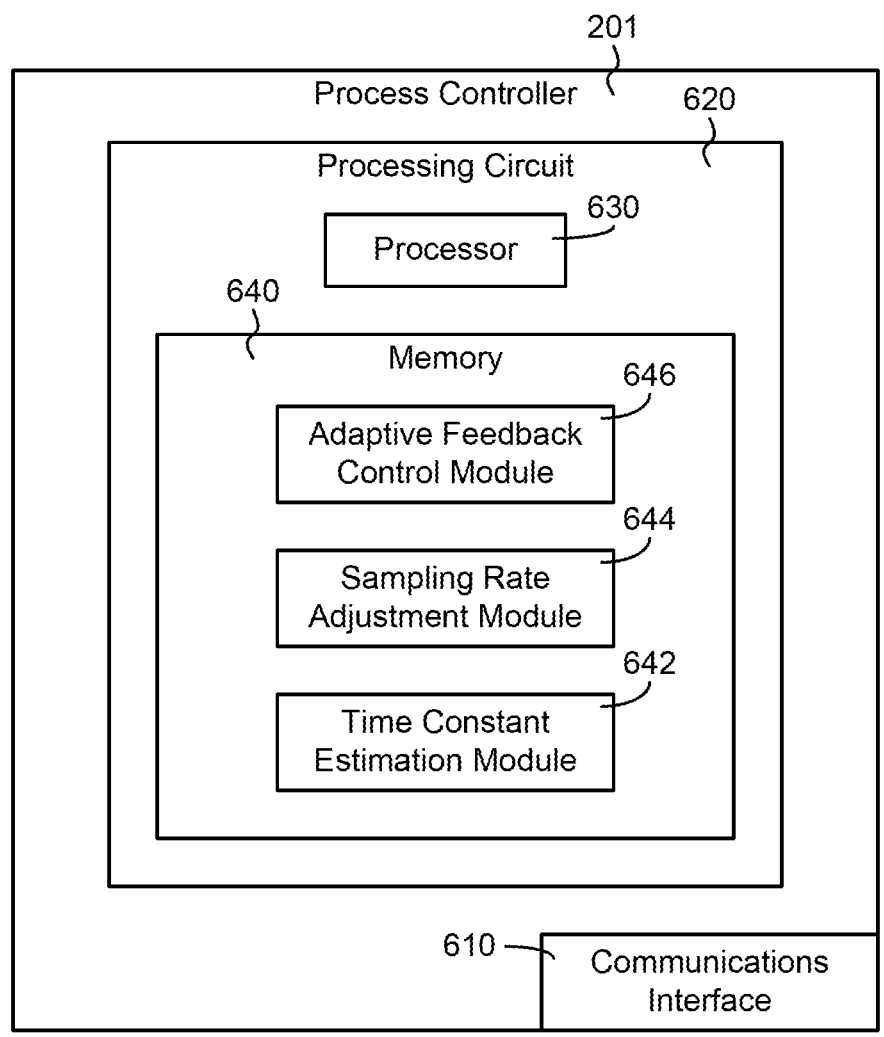
FIG. 6 is a detailed block diagram of the process controller of FIG. 2, according to an exemplary embodiment.

Referring now to FIG. 6, a block diagram of process controller 201 is shown, according to an exemplary embodiment. Process controller 201 is shown to include a communications interface 610 and a processing circuit 620. Communications interface 610 may include any number of jacks, wire terminals, wire ports, wireless antennas, or other communications adapters, hardware, or devices for communicating information (e.g., setpoint r information, error signal e information, feedback signal y information, etc.) or control signals (e.g., a control signal u, etc.) Communications interface 610 may be configured to send or receive information and/or control signals between process controller 201 and a controlled system or process (e.g., plant 204), between process controller 201 and a supervisory controller, or between process controller 201 and a local controller (e.g., a device, building, or network specific controller). Communications interface 610 may be configured to send or receive information over a local area network (LAN), wide area network (WAN), and/or a distributed network such as the Internet. Communications interface 610 can include communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

Processing circuit 620 is shown to include a processor 630 and memory 640. Processor 630 can be implemented as a general purpose processor, an application specific integrated circuit (ASIC), one or more field programmable gate arrays (FPGAs), a group of processing components, or other suitable electronic processing components.

Memory 640 (e.g., memory device, memory unit, storage device, etc.) is one or more devices (e.g., RAM, ROM, Flash memory, hard disk storage, etc.) for storing data and/or computer code for completing or facilitating the various processes, layers and modules described in the present disclosure. Memory 640 may be or include volatile memory or non-volatile memory. Memory 640 may include database components, object code components, script components, or any other type of information structure for supporting the various activities and information structures described in the present application. According to an exemplary embodiment, memory 640 is communicably connected to processor 630 via processing circuit 620 and includes computer code for executing (e.g., by processing circuit 620 and/or processor 630) one or more processes described herein. Memory 640 is shown to include a time constant estimation module 642, a sampling rate adjustment module 644, and an adaptive feedback control module 646.

Time constant estimation module 642 may be configured to perform the functions of time constant estimator 214 as described in reference to FIG. 2. Time constant estimation module 642 may receive an error signal e, a setpoint signal r, and or a feedback signal y. Time constant estimation module 642 may be configured to monitor the error signal e and estimate a time constant $\tau_p$ for a controlled system or process based on the error signal e. In some implementations, time constant estimation module 642 may determine whether the controlled system is to a setpoint change or a load disturbance (e.g., by receiving a signal from adaptive feedback control module 646, by analyzing the error signal e, etc.).

If the system is subject to a setpoint change, time constant estimation module 642 may estimate the time constant $\tau_p$ by determining an area under the error curve (e.g., defined by error signal e). The area under the error curve may be divided by the magnitude of the setpoint change to determine the estimated time constant $\tau_p$. If the system is subject to a load disturbance, the time constant $\tau_p$ may be estimated by determining a time at which the error signal e reaches an extremum (e.g., a minimum or a maximum) in response to the load disturbance. Time constant estimation module 642 may subtract the time value at which the load disturbance begins from the time value at which the error signal e reaches an extremum to determine the estimated time constant $\tau_p$. The error signal e may be monitored for zero crossings (e.g., a sign change from positive to negative or negative to positive) to determine the time at which a load disturbance begins. Time constant estimation module 642 may communicate the estimated time constant $\tau_p$ to sampling rate adjustment module 644.

Sampling rate adjustment module 644 may be configured to perform the functions of sampling rate adjustor 216 as described in reference to FIG. 2. Sampling rate adjustment module 644 may receive the estimated time constant $\tau_p$ from time constant estimation module 642 and calculate a sampling rate h based on the estimated time constant $\tau_p$. In some embodiments, sampling rate adjustment module 644 may set the sampling rate h to a value approximately equal to one-tenth of the estimated time constant $$\tau_p \left( \text{e.g., } h \approx \frac{\tau_p}{10} \right).$$

In some embodiments, sampling rate adjustment module 644 compares the calculated sampling rate h with a current or previous sampling rate $h_0$. If the calculated sampling rate h differs significantly from $h_0$ (e.g., h is less than half $h_0$ or greater than twice $h_0$), sampling rate adjustment module may update the sampling rate to the recently calculated value h. The updated sampling rate h may be communicated to adaptive feedback control module 646.

Adaptive feedback control module 646 may be configured to perform the functions of PI controller 202 and adaptive tuner 212 as described in reference to FIG. 2. Adaptive feedback control module 646 may include the functionality of a pattern recognition adaptive controller (PRAC), a model recognition adaptive controller (MRAC), or any other type of adaptive tuning or feedback controller. Adaptive feedback control module 646 may receive an error signal e representing a difference between a feedback signal y and a setpoint r. Adaptive feedback control module 646 may calculate a control signal u for a controlled process or system based on the error signal e. The control signal u may be communicated to the controlled process or system via communications interface 610.

Adaptive Sampling Rate Adjustment

Figure 7:
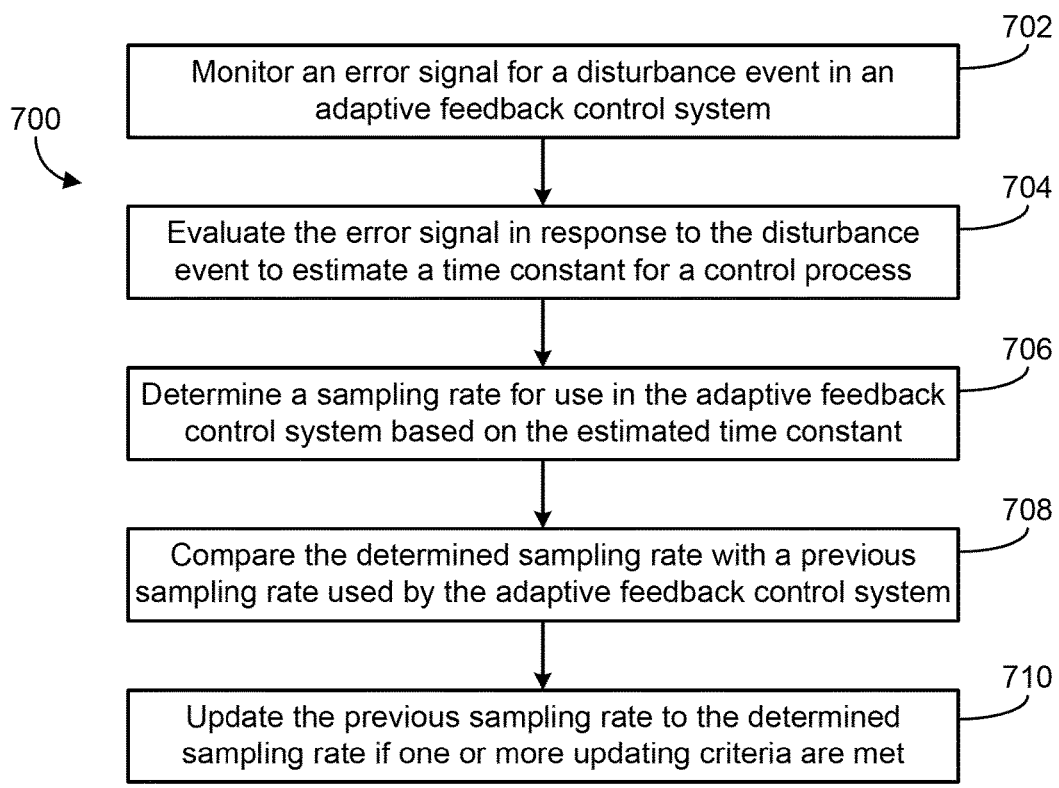
FIG. 7 is a flowchart of a process for adaptively adjusting a sampling rate in a feedback control system, according to an exemplary embodiment.

Referring now to FIG. 7, a flowchart of a process 700 for adaptively adjusting a sampling rate in a feedback control system is shown, according to an exemplary embodiment. Process 700 is shown to include monitoring an error signal for a disturbance event (step 702). The error signal e may be a difference between a setpoint r and a feedback signal y received from a control process or system. In some embodiments, step 702 includes determining whether a disturbance in the error signal e (e.g., a deviation in the error signal from a zero error steady state) qualifies as a disturbance event. Step 702 may involve comparing a magnitude of the error signal e or an area bounded by the error signal e to a threshold value. In some embodiments, the threshold value may be a noise threshold (e.g., measurement noise, process noise, combined noise, etc.). If the magnitude or area exceeds the threshold value, the disturbance may be classified as a disturbance event. In some embodiments, the remaining steps of process 700 (e.g., steps 704-710) are only performed if a detected disturbance qualifies as a disturbance event. In other embodiments, steps 704-710 are performed for all detected disturbances.

Step 702 may include identifying the disturbance event as at least one of a setpoint change and a load disturbance. In some embodiments, the disturbance event may be identified via a status indicator or signal received from an adaptive feedback controller. For example, a PRAC may output a signal indicating whether the control system is subject to a setpoint change or a load disturbance. In other embodiments, the disturbance event may be identified by analyzing the error signal e. For example, a setpoint change may result in an instantaneous change in the error signal e whereas a load disturbance may result in continuous increase in the magnitude of the error signal e.

Still referring to FIG. 7, process 700 is shown to further include evaluating the error signal in response to the disturbance event to estimate a time constant for a control process (step 704). If the disturbance event is identified as a setpoint change in step 702, evaluating the error signal e may involve tracking an area A bounded by the error signal e in response to the setpoint change. The area A bounded by the error signal may be an area between an error curve (e.g., a graphical representation of the error signal as a function of time) and the time axis (e.g., a "zero error" line extending along the time axis). The area A bounded by the error signal may be an area above the time axis (e.g., if the error curve includes positive error values) or an area below the time axis (e.g., if the error curve includes negative error values). The area A bounded by the error signal may be tracked analytically (e.g., by expressing the error signal as an equation, integrating the equation, $A=\int_0^x e(t)dt$, etc.) or numerically (e.g., by multiplying a magnitude of the error signal by a duration of a time step, adding the resultant products, $$A = \sum_{k=1}^{n} e_k(t) \cdot \Delta t_k, \text{ etc.}).$$

In some embodiments, the area A bounded by the error signal e may be tracked during a tracking interval. The tracking interval may begin at the time of the setpoint change and end at a time when the error signal e crosses the time axis (e.g., a "zero crossing"). In other embodiments, the tracking interval may end at a time when a magnitude of the error signal e crosses a magnitude threshold. The magnitude threshold may be a non-zero error value at which it may be determined that the control system has adequately responded to the disturbance event. In some embodiments, the magnitude threshold may be a noise threshold (e.g., measurement noise, process noise, etc.) for the controlled system or process.

If the disturbance event is identified as a setpoint change in step 702, step 704 may further include dividing the area A bounded by the error signal by a magnitude a of the setpoint change to determine the estimated time constant of the control process $$\left( \text{e.g., } \tau_p = \frac{A}{a} \right).$$

In some embodiments, the magnitude of the setpoint change may be obtained by analyzing the setpoint signal (e.g., subtracting a setpoint value before the setpoint change from a setpoint value after the setpoint change). In other embodiments, the magnitude a of the setpoint change may be obtained by analyzing the error signal e (e.g., determining the magnitude of the instantaneous increase in the magnitude of the error signal). In further embodiments, the magnitude a of the setpoint change may be received from another process or system.

Still referring to step 704, if the disturbance event is identified as a load disturbance in step 702, evaluating the error signal in response to the disturbance event may include tracking a magnitude of the error signal |e| in response to the load disturbance and determining a time at which the magnitude of the error signal |e| reaches a maximum in response to the load disturbance. The maximum magnitude of the error signal $|e|_{max}$ may be an extremum (e.g., a maximum value $e_{max}$ or minimum value $e_{min}$) in response to the load disturbance. Unlike setpoint changes, load disturbances may cause the magnitude of the error signal |e| to increase continuously (e.g., non-instantaneously) until reaching a maximum $|e|_{max}$ at a time $t_{ex}$ after the disturbance occurs. If the disturbance event is identified as a load disturbance in step 702, step 704 may involve subtracting a time $t_d$ at which the magnitude of the error signal begins to increase in response to the load disturbance from the time at which the magnitude of the error signal reaches the maximum $t_{ex}$ to determine the time constant of the control process (e.g., $\tau_p = t_{ex} - t_d$).

Still referring to FIG. 7, process 700 is shown to further include determining a sampling rate for use in the feedback control system based on the estimated time constant (step 706). The sampling rate h may be a sampling period (e.g., an interval between samples) or a sampling frequency (e.g., a rate at which samples are obtained). In some embodiments, the sampling rate h may be used to select a subset of measurements from a feedback signal y for use in determining a control signal u to be applied to a controlled process. In other embodiments, the sampling rate h may specify the interval at which the control signal u is updated. In some embodiments, step 706 may involve selecting a sampling rate h between one-fortieth of the estimated time constant $\tau_p$ and the estimated time constant $$\tau_p \left( \text{e.g., } \frac{\tau_p}{40} \leq h \leq \tau_p \right).$$

In a more specific embodiment, step 706 may involve selecting a sampling rate h approximately one-tenth of the estimated time constant $$\tau_p \left( \text{e.g., } h \approx \frac{\tau_p}{10} \right).$$

Still referring to FIG. 7, in some embodiments, process 700 may further include comparing the determined sampling rate h with a previous sampling rate $h_0$ used by the feedback control system (step 708) and updating the previous sampling rate $h_0$ to the determined sampling rate h if the comparison reveals that one or more updating criteria are met (step 710). The updating criteria may prevent the previous sampling rate $h_0$ from being updated if the change would be minimal or insignificant. For example, the updating criteria may include updating the previous sampling rate $h_0$ to the sampling rate h determined in step 706 if the determined sampling rate h is at least twice the previous sampling rate (e.g., $h \geq 2 h_0$). In some embodiments, the previous sampling rate $h_0$ may be updated to the sampling rate h determined in step 706 if the determined sampling rate h is no greater than half the previous sampling rate (e.g., $h \leq 0.5 h_0$). In further embodiments, steps 708 and 710 may involve updating the previous sampling rate $h_0$ if the difference between the previous sampling rate $h_0$ and the sampling rate h determined in step 706 exceeds a difference threshold (e.g., $|h_0 - h| > \text{threshold}$) or if the ratio between $h_0$ and h exceeds a ratio threshold $$\left( \text{e.g., } \frac{h_0}{h} > \text{threshold}, \frac{h}{h_0} > \text{threshold}, \text{etc.} \right).$$

In some implementations, the systems and methods described herein may be used in a closed-loop feedback control system. When implemented in a closed-loop system, a disturbance event may be detected by monitoring an error signal (e.g., for a load disturbance or a setpoint change). The error signal may be based on a feedback signal received from a control process. In other implementations, the described systems and methods may be used in a feed-forward control system, and open loop control system, a model predictive control system, a cascaded control system, and/or any other type of automated control system. When implemented in non-feedback control systems, the disturbance event may be detected by monitoring a control signal (e.g., provided to a control process), a feed-forward signal (e.g., received from a feed-forward estimator), a sensor signal (e.g., from a sensor monitoring a variable other than the controlled variable), or any other type of signal (e.g., calculated or measured) communicated between one or more components of the control system. The monitored signal may be analyzed as described above (e.g., by time constant estimator 214) for estimating a time constant and determining a sampling rate for use in the non-feedback control system.

Using Response Time to Detect Faults and Adjust Operating Parameters

Figure 8:
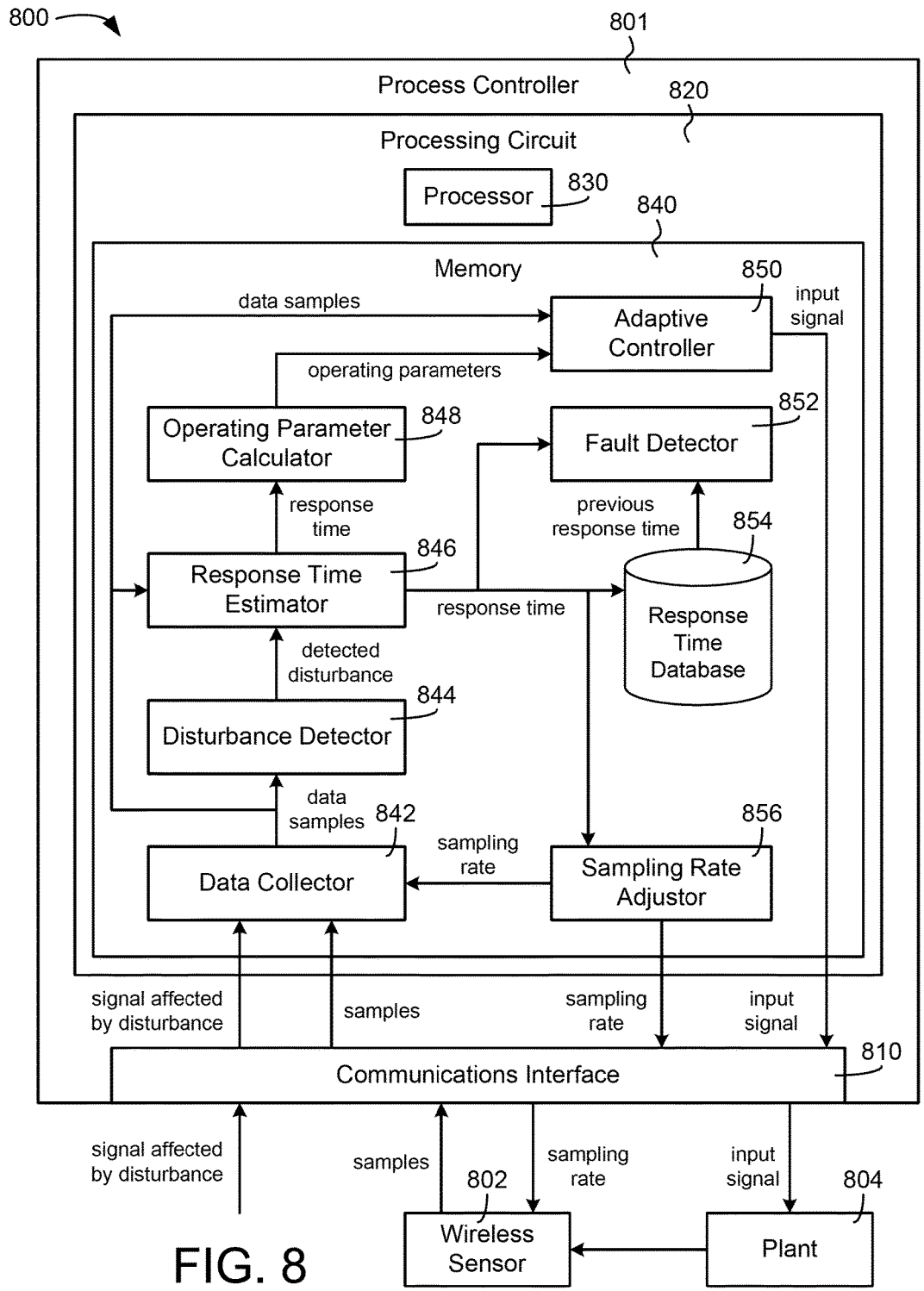
FIG. 8 is a block diagram of a control system configured to estimate the response time of a plant and use the response time to update operating parameters used by a process controller, according to an exemplary embodiment.

Referring now to FIG. 8, a block diagram of another control system 800 is shown, according to an exemplary embodiment. In some embodiments, control system 800 is a feedback control system. In other embodiments, control system 800 can be a feed-forward control system, and open loop control system, a model predictive control system, a cascaded control system, and/or any other type of automated control system. Control system 800 is shown to include a process controller 801, a wireless sensor 802, and a plant 804. Process controller 801 may be configured to monitor and control plant 804. When a disturbance occurs in control system 800, process controller 801 can monitor a signal affected by the disturbance to estimate a response time of plant 804. Process controller 801 can use the estimated response time of plant 804 to determine an appropriate sampling rate, detect faults, and/or adjust operating parameters used by process controller 801. In some embodiments, process controller 801 provides the determined sampling rate to wireless controller 802. Wireless controller 802 can use the sampling rate to collect and transmit data samples to process controller 801.

Process controller 801 is shown to include a communications interface 810 and a processing circuit 820. Communications interface 810 may include any number of jacks, wire terminals, wire ports, wireless antennas, or other communications adapters, hardware, or devices for communicating information (e.g., setpoint r information, error signal e information, feedback signal y information, etc.) or control signals (e.g., a control signal u, etc.). Communications interface 810 may be configured to send or receive information and/or control signals between process controller 801 and a controlled system or process (e.g., plant 804), between process controller 801 and a supervisory controller, or between process controller 801 and a local controller (e.g., a device, building, or network specific controller). Communications interface 810 may be configured to send or receive information over a local area network (LAN), wide area network (WAN), and/or a distributed network such as the Internet. Communications interface 810 can include communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

Processing circuit 820 is shown to include a processor 830 and memory 840. Processor 830 can be implemented as a general purpose processor, an application specific integrated circuit (ASIC), one or more field programmable gate arrays (FPGAs), a group of processing components, or other suitable electronic processing components. Memory 840 (e.g., memory device, memory unit, storage device, etc.) is one or more devices (e.g., RAM, ROM, Flash memory, hard disk storage, etc.) for storing data and/or computer code for completing or facilitating the various processes, layers and modules described in the present disclosure. Memory 840 may be or include volatile memory or non-volatile memory. Memory 840 may include database components, object code components, script components, or any other type of information structure for supporting the various activities and information structures described in the present application. According to an exemplary embodiment, memory 840 is communicably connected to processor 830 via processing circuit 820 and includes computer code for executing (e.g., by processing circuit 820 and/or processor 830) one or more processes described herein.

Process controller 801 is shown to include a data collector 842. Data collector 842 can receive a data signal and/or data samples via communications interface 810. In some embodiments, data collector 842 samples a signal affected by a disturbance. For example, data collector 842 is shown receiving a signal affected by a disturbance. The signal affected by a the disturbance can be a feedback signal from plant 804 (e.g., feedback signal y), a setpoint signal (e.g., setpoint signal r), an error signal e (e.g., e=r−y), a control signal provided to plant 804 (e.g., input signal u), or any other signal in control system 800. The signal affected by the disturbance can be any signal that changes when a disturbance occurs in control system 800. The change can be a direct result of the disturbance (e.g., a change in feedback signal y) or an indirect result of process controller 801 reacting to the disturbance. For example, the signal affected by the disturbance can be an input signal u provided to plant 804 to compensate for a detected disturbance.

In some embodiments, data collector 842 samples the signal affected by the disturbance at a sampling rate received from sampling rate adjustor 856. The sampling rate can be automatically adjusted based on the estimated response time of plant 804. The data samples generated by data collector 842 can be provided to adaptive controller 850 for use in determining an appropriate input signal u for plant 804. In some embodiments, data collector 842 receives data samples from wireless sensor 802. The data samples from wireless sensor 802 can be collected and/or transmitted at the sampling rate determined by sampling rate adjustor 856.

Still referring to FIG. 8, process controller 801 is shown to include a disturbance detector 844. Disturbance detector 844 can detect a disturbance in control system 800. In some embodiments, the disturbance is a setpoint change or a load disturbance. Disturbance detector 844 can detect a setpoint change or a load disturbance by monitoring the signal affected by the disturbance. In some embodiments, disturbance detector 844 detects the disturbance using a status indicator or signal received from adaptive controller 850. For example, controller 850 may output a signal indicating whether control system 800 is subject to a setpoint change or a load disturbance. In some embodiments, the disturbance includes a user input (e.g., a user-specified setpoint change) and disturbance detector 844 detects the disturbance by monitoring the user input.

In some embodiments, disturbance detector 844 detects the disturbance by analyzing the error signal e in a feedback control system. For example, a setpoint change may result in an instantaneous change in the error signal e whereas a load disturbance may result in continuous increase in the magnitude of the error signal e. When implemented in non-feedback control systems, disturbance detector 844 can detect the disturbance by monitoring a control signal provided to plant 804, a feed-forward signal (e.g., received from a feed-forward estimator), a sensor signal (e.g., from a sensor monitoring a variable other than the controlled variable), or any other type of signal (e.g., calculated or measured) communicated between one or more components of control system 800. Disturbance detector 844 can notify response time estimator 846 when a disturbance is detected in control system 800

Response time estimator 846 may be configured to perform the functions of time constant estimator 214 as described in reference to FIG. 2. For example, response time estimator 846 can evaluate the signal affected by the disturbance to estimate the response time of plant 804. The response time of plant 804 is a parameter that characterizes the response of plant 804 to the disturbance. For example, the response time of plant 804 can be the time constant $\tau_p$ (as previously described), a dominant time constant of plant 804, a bandwidth of plant 804, an open loop response time, or any other parameter that characterizes the time response of plant 804 to a disturbance. In some embodiments, response time estimator 846 estimates the response time of plant 804 in response to a detected disturbance in control system 800 (e.g., in response to receiving a disturbance notification from disturbance detector 844). Response time estimator 846 can evaluate the signal affected by the disturbance in the same way that time constant estimator 214 evaluates the error signal e.

In some embodiments, response time estimator 846 determines whether control system 800 is subject to a setpoint change or a load disturbance (e.g., by receiving a signal from adaptive controller 850, by analyzing the signal affected by the disturbance, etc.). If the system is subject to a setpoint change, response time estimator 846 may estimate the response time by integrating the signal affected by the disturbance. For example, response time estimator 846 can determine an area under a curve defined by the signal affected by the disturbance. Response time estimator 846 can divide the area under the curve by the magnitude of the setpoint change to determine the estimated response time.

If the system is subject to a load disturbance, response time estimator 846 can estimate the response time by determining a time at which the signal affected by the disturbance reaches an extremum (e.g., a minimum or a maximum) in response to the load disturbance. Response time estimator 846 may subtract the time value at which the load disturbance begins from the time value at which the signal reaches an extremum to determine the estimated response time. Response time estimator 846 can monitor the signal affected by the disturbance for threshold value crossings (e.g., a sign change from positive to negative or negative to positive) to determine the time at which a load disturbance begins. Response time estimator 846 may communicate the estimated response time to operating parameter calculator 848, fault detector 852, sampling rate adjustor 856, or store the estimated response time in a response time database 854.

Sampling rate adjustor 856 may be configured to perform the functions of sampling rate adjustor 216 as described in reference to FIG. 2. Sampling rate adjustor 856 may receive the estimated response time from response time estimator 846 and calculate a sampling rate h based on the estimated response time. In some embodiments, sampling rate adjustor 856 sets the sampling rate h to a value approximately equal to one-tenth of the estimated response time. In some embodiments, sampling rate adjustor 856 compares the calculated sampling rate h with a current or previous sampling rate $h_0$. If the calculated sampling rate h differs significantly from $h_0$ (e.g., h is less than half $h_0$ or greater than twice $h_0$), sampling rate adjustor 856 may update the sampling rate to the recently calculated value h.

In some embodiments, the updated sampling rate h is a minimum acceptable sampling rate. The minimum acceptable sampling rate may be a function of the estimated response time (e.g., one-tenth of the estimated response time) and may indicate the minimum rate at which data samples can be collected from plant 804 to ensure adequate control. In some embodiments, sampling rate adjustor 856 provides the updated sampling rate h to data collector 842. Data collector 842 can use the updated sampling rate h to adjust the rate at which data collector 842 collects samples of the signal affected by the disturbance. In some embodiments, sampling rate adjustor 856 provides the updated sampling rate h to wireless sensor 802. Wireless sensor 802 can use the updated sampling rate h to adjust a rate at which wireless sensor 802 collects and/or transmits data samples to process controller 801.

Still referring to FIG. 8, process controller 801 is shown to include an operating parameter calculator 848. Operating parameter calculator 848 may be configured to perform the functions of adaptive tuner 212, as described with reference to FIG. 2. In some embodiments, operating parameter calculator 848 uses the estimated response time of plant 804 to calculate values of one or more operating parameters used by adaptive controller 850. For example, operating parameter calculator 848 can calculate values for controller parameters such as the controller gain $K_c$ and the integral time $T_i$ as a function of the estimated response time. In some embodiments, operating parameter calculator 848 adjusts an initial value of each operating parameter based on the estimated response time, as described with reference to FIGS. 5A-5D. Several examples of how operating parameter calculator 848 can calculate controller operating parameters based on the estimated response time are described in detail in U.S. Pat. Nos. 5,355,305, 5,506,768, and 6,937,909. The entire disclosure of each of these patents is incorporated by reference herein.

Adaptive controller 850 may be configured to perform the functions of PI controller 202 as described in reference to FIG. 2. Adaptive controller 850 may include the functionality of a pattern recognition adaptive controller (PRAC), a model recognition adaptive controller (MRAC), or any other type of adaptive tuning or feedback controller. Adaptive controller 850 can be a feedback controller, a feedforward controller, a model predictive controller, or any other type of controller that generates an input signal for plant 804. Adaptive controller 850 may receive the data samples from data collector 842 and/or wireless sensor 802. Adaptive controller 850 may use the data samples in combination with the operating parameters calculated by operating parameter calculator 848 to generate the input signal u for plant 804. The input signal u may be communicated to plant 804 via communications interface 810.

Still referring to FIG. 8, process controller 801 is shown to include a fault detector 852 and a response time database 854. Response time database 854 may store a history of the response times determined by response time estimator 846. Each time a new response time is estimated for plant 804, the new response time can be stored in response time database 854. The response time of plant 804 may be expected to remain relatively constant in the absence of a fault. A significant change in the response time may indicate that a fault has occurred. For example, faulty building equipment may cause plant 804 to react more slowly to a disturbance, which can result in a longer response time.

Fault detector 852 can use the history of response times for plant 804 to detect faults in control system 800. For example, fault detector 852 can compare a current response time generated by response time estimator 846 with a previous response time from response time database 854. If the current response time is significantly different from the previous response time, fault detector 852 may determine that a fault has occurred. In some embodiments, fault detector 852 calculates a difference between the current response time and the previous response time and compares the difference with a threshold value. If the difference exceeds the threshold value, fault detector 852 may determine that a fault has occurred. In some embodiments, fault detector 852 calculates a ratio of the current response time to the previous response time. If the ratio is less than a minimum threshold value or greater than a maximum threshold value, fault detector 852 may determine that a fault has occurred.

Figure 9:
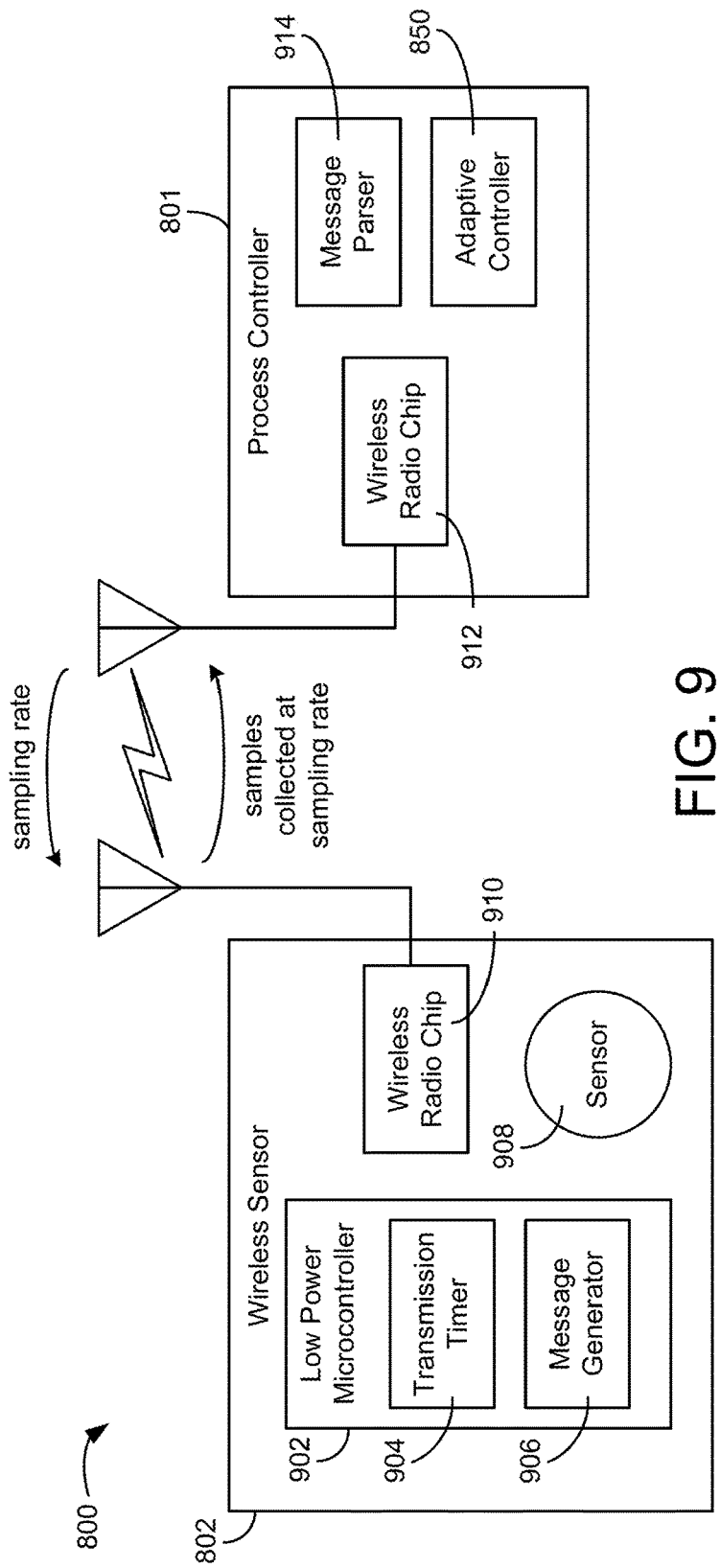
FIG. 9 is a block diagram illustrating the process controller of FIG. 8 providing a sampling rate to a wireless sensor, which uses the sampling rate to collect and transmit samples of a measured variable to the process controller, according to an exemplary embodiment.

Referring now to FIG. 9, a portion of control system 800 is shown in greater detail, according to an exemplary embodiment. System 800 is shown to include process controller 801 and wireless sensor 802. Process controller 801 can provide wireless sensor 802 with a sampling rate. The sampling rate can be determined automatically by process controller 801 based on the estimated response time of plant 804, as described with reference to FIG. 8. Wireless sensor 802 can use the sampling rate from process controller 801 to collect and transmit samples of a measured variable to process controller 801. For example, wireless sensor 802 can collect and/or transmit samples of the measured variable at the sampling rate provided by process controller 801. Wireless sensor 802 can provide the samples of the measured variable to process controller 801 as a feedback signal (e.g., feedback signal y).

Wireless sensor 802 is shown to include a sensor 908, a low-power microcontroller 902, and a wireless radio chip 910. Sensor 908 can measure a variable of interest and provide measured data values to low-power microcontroller 902. Sensor 908 may be a temperature sensor, humidity sensor, enthalpy sensor, pressure sensor, lighting sensor, flow rate sensor, voltage sensor, valve position sensor, load sensor, resource consumption sensor, and/or any other type of sensor capable of measuring a variable of interest in control system 800. In some embodiments, sensor 908 is powered by a battery within wireless sensor 802. Sensor 908 may collect data samples at a regular sampling interval. In some embodiments, the sampling interval is defined by the sampling rate received from process controller 801. For example, if the sampling rate received from process controller 801 is one sample per minute, sensor 908 may collect a temperature measurement in a particular zone of a building every minute.

Low-power microcontroller 902 can generate a message containing a value of the measured variable and can provide the message to process controller 801. Low-power microcontroller 902 may be any controller component capable of processing data. For example, microcontroller 902 may include a processing circuit containing a processor capable of receiving, processing, and outputting data. In some embodiments, microcontroller 902 may contains memory capable of storing data. In other embodiments, microcontroller 902 may not include a memory. Low power microcontroller 902 is shown to include a wireless transmission timer 904 and a message generator 906.

Transmission timer 904 may be configured to monitor and control timing of wireless transmissions from sensor 802 to process controller 801. Transmission timer 904 may be configured to identify or determine a transmission interval and/or a transmission rate for wireless sensor 802 based on the sampling rate received from process controller 801. For example, transmission timer 904 may cause low power microcontroller 902 to transmit data samples to process controller at the sampling rate provided by process controller 801. In some embodiments, transmission timer 904 determines a transmission interval that optimizes (e.g., minimizes) the power consumption of wireless sensor 802. The optimal transmission interval may be subject to a sampling rate constraint. The sampling rate constraint may define a minimum acceptable sampling rate, which may be provided by process controller 801. Transmission timer 904 can use the sampling rate from process controller 801 to determine the optimal rate at which to collect and/or transmit data samples to process controller 801, subject to the sampling rate constraint.

Message generator 906 may be configured to generate a messages containing samples of the measured variable. In some embodiments, each message contains one sample of the measured variable. In other embodiments, each message contains multiple samples of the measured variable. For example, message generator 906 can package multiple samples of the measured variable into a single message to further reduce the number of messages transmitted to process controller 801. Message generator 906 may provide the messages containing the data samples to process controller 801 at the transmission interval determined by transmission timer 904. Low-power microcontroller 902 provides the messages to wireless radio chip 910, which wirelessly transmits the message to process controller 801.

Process controller 801 is shown to include a wireless radio chip 912, a message parser 914, and adaptive controller 850. Wireless radio chip 912 receives messages from wireless radio chip 910 of wireless sensor 802 and provides the messages to message parser 914. Message parser 914 extracts data values from the message and provides the data values to adaptive controller 850. Adaptive controller 850 uses the data values as inputs to a control algorithm to generate a control output (e.g., a control signal for equipment of plant 804 that operate to affect the measured variable). In some embodiments, process controller 801 includes some or all of the features described with reference to FIG. 8.

In some embodiments, wireless radio chips 910 and 912 communicate with each other using a wireless communications protocol (e.g., ZigBee, WiFi, Bluetooth, NFC, etc.). In some embodiments, other communications interfaces and components may be included, such as a wired connection. Wireless radio chips 910 and 912 may contain transceivers capable of transmitting and receiving data through an antenna. Wireless radio chips 910 and 912 may be different chips and may use different hardware while using the same wireless communications protocol. Wireless radio chips 910 and 912 may operate using any frequency range, such as RF. Chips 910 and 912 may use frequencies outside of the RF range, and may not be radio chips. In some embodiments, chips 910 and 912 may communicate using other frequency ranges, such as IR. Chips 910 and 912 may utilize any communications interface, and are not limited to those specifically enumerated.

In some embodiments, wireless sensor 802 and process controller 802 include some or all of the components described in U.S. patent application Ser. No. 14/989,740 titled "Systems and Methods for Extending the Battery Life of a Wireless Sensor in a Building Control System" and filed Jan. 6, 2016, the entire disclosure of which is incorporated by reference herein.

Sampling Rate Adjustment and Fault Detection Processes

Figure 10:
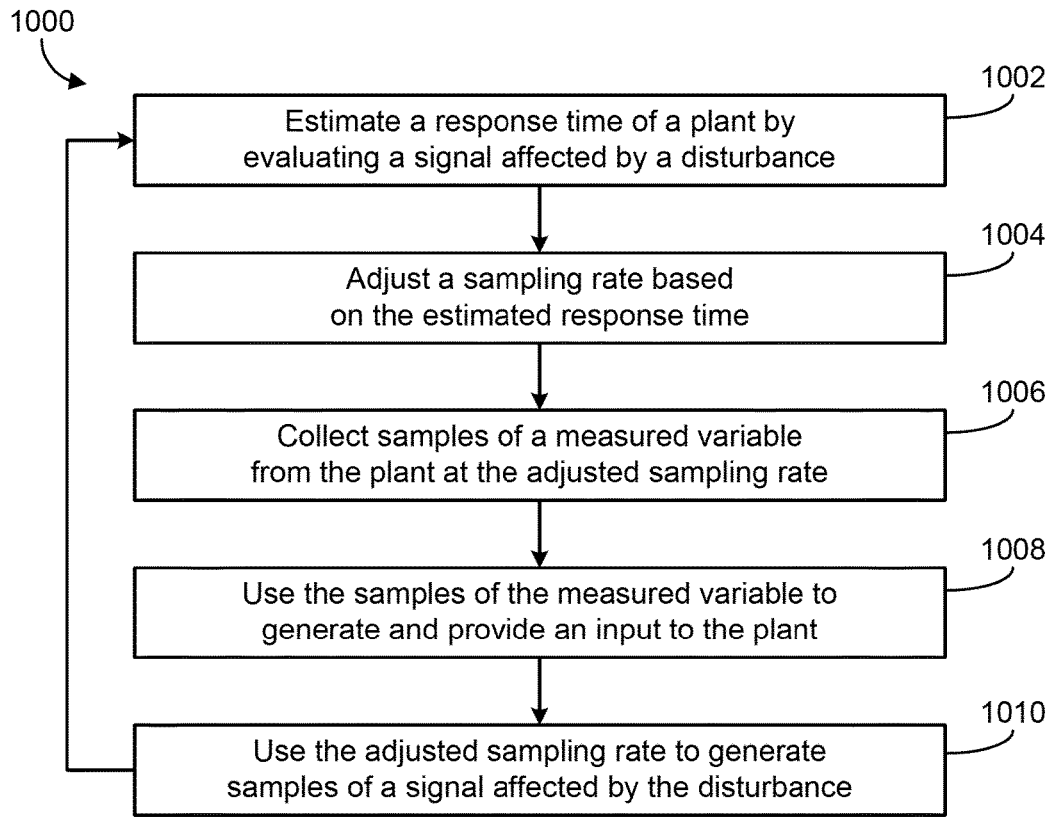
FIG. 10 is flowchart of a process for automatically adjusting the sampling rate used by a wireless sensor in a control system, according to an exemplary embodiment.

Referring now to FIG. 10, a flowchart of a process 1000 for automatically adjusting the sampling rate used by a wireless sensor in a control system is shown, according to an exemplary embodiment. Process 1000 can be performed by one or more components of control system 800, as described with reference to FIG. 8.

Process 1000 is shown to include estimating a response time of a plant (e.g., plant 804) by evaluating a signal affected by a disturbance (step 1002). In some embodiments, step 1002 is performed by response time estimator 846. The response time of the plant 804 is a parameter that characterizes the response of plant 804 to the disturbance. For example, the response time of plant 804 can be the time constant $\tau_p$ (as previously described), a dominant time constant of plant 804, a bandwidth of plant 804, an open loop response time, or any other parameter that characterizes the time response of plant 804 to a disturbance. In some embodiments, step 1002 is performed in response to a detected disturbance in control system 800 (e.g., in response to receiving a disturbance notification from disturbance detector 844).

In some embodiments, step 1002 includes determining whether the control system is subject to a setpoint change or a load disturbance (e.g., by receiving a signal from adaptive controller 850, by analyzing the signal affected by the disturbance, etc.). If the system is subject to a setpoint change, step 1002 may include estimating the response time by integrating the signal affected by the disturbance. For example, step 1002 can include determining an area under a curve defined by the signal affected by the disturbance. Step 1002 can include dividing the area under the curve by the magnitude of the setpoint change to determine the estimated response time.

If the system is subject to a load disturbance, step 1002 can include estimating the response time by determining a time at which the signal affected by the disturbance reaches an extremum (e.g., a minimum or a maximum) in response to the load disturbance. Step 1002 can include subtracting the time value at which the load disturbance begins from the time value at which the signal reaches an extremum to determine the estimated response time. Step 1002 can include monitoring the signal affected by the disturbance for threshold value crossings (e.g., a sign change from positive to negative or negative to positive) to determine the time at which a load disturbance begins.

Process 1000 is shown to include adjusting a sampling rate based on the estimated response time (step 1004). In some embodiments, step 1004 is performed by sampling rate adjustor 856. In some embodiments, step 1004 includes setting the sampling rate h to a value approximately equal to one-tenth of the estimated response time. In some embodiments, step 1004 includes comparing the calculated sampling rate h with a current or previous sampling rate $h_0$. If the calculated sampling rate h differs significantly from $h_0$ (e.g., h is less than half $h_0$ or greater than twice $h_0$), step 1004 may include updating the sampling rate to the recently calculated value h. In some embodiments, the updated sampling rate h is a minimum acceptable sampling rate. The minimum acceptable sampling rate may be a function of the estimated response time (e.g., one-tenth of the estimated response time) and may indicate the minimum rate at which data samples can be collected from plant 804 to ensure adequate control.

In some embodiments, step 1004 includes providing the updated sampling rate h to a data collector (e.g., data collector 842). The data collector can use the updated sampling rate h to adjust the rate at which the data collector collects samples of the signal affected by the disturbance. In some embodiments, step 1004 includes providing the updated sampling rate h to a wireless sensor (e.g., wireless sensor 802). The wireless sensor can use the updated sampling rate h to adjust a rate at which the wireless sensor collects and/or transmits data samples to process controller 801.

Process 1000 is shown to include collecting samples of a measured variable from the plant at the adjusted sampling rate (step 1006). In some embodiments, step 1006 is performed by wireless sensor 802. For example, wireless sensor 802 can receive the adjusted sampling rate from process controller 801 and use the adjusted sampling rate to collect samples of the measured variable (e.g., collecting samples of the measured variable at the adjusted sampling rate). In some embodiments, wireless sensor 802 uses the adjusted sampling rate to optimize the power consumption of wireless sensor 802. For example, wireless sensor 802 may perform an optimization process to minimize the power consumed by measuring and/or transmitting data samples to process controller 801. Step 1006 can include using the adjusted sampling rate as a constraint on the optimization process to ensure that the measured variable is sampled and/or transmitted at least as frequently as the adjusted sampling rate.

Process 1000 is shown to include using the samples of the measured variable to generate and provide an input to the plant (step 1008). In some embodiments, step 1008 is performed by adaptive controller 850. Step 1008 may include using the samples of the measured variable to generate an input signal u for plant 804. In some embodiments, the samples of the measured variable are used in combination with one or more operating parameters (e.g., controller gain $K_c$, integral time $T_i$, etc.) to generate the input signal u. For example, adaptive controller 850 can apply the samples of the measured variable as inputs to a transfer function $$\left(\text{e.g., } G_c(s) = \frac{K_c(1 + T_i s)}{T_i s}\right)$$

to generate the input signal u.

In some embodiments, step 1008 includes using the estimated response time of plant 804 to calculate values of one or more operating parameters used by adaptive controller 850. For example, step 1008 can include calculating values for controller parameters such as the controller gain $K_c$ and the integral time $T_i$ as a function of the estimated response time. In some embodiments, step 1008 includes adjusting an initial value of each operating parameter based on the estimated response time, as described with reference to FIGS. 5A-5D. Several examples of how controller operating parameters can be adjusted or calculated based on the estimated response time are described in detail in U.S. Pat. Nos. 5,355,305, 5,506,768, and 6,937,909.

Process 1000 is shown to include using the adjusted sampling rate to generate samples of a signal affected by the disturbance (step 1010). In some embodiments, step 1010 is performed by data collector 842. For example, data collector 842 can monitor the signal affected by the disturbance and collect samples of the signal affected by the disturbance at the adjusted sampling rate. In some embodiments, the signal affected by the disturbance is a feedback signal from plant 804 or an error signal based on the feedback signal (e.g., a difference between a feedback signal and a setpoint). In some embodiments, the signal affected by the disturbance is the measured variable and/or a function of the measured variable. In some embodiments, the signal affected by the disturbance is an input signal provided to the plant 804 and/or a function of the input signal provided to the plant.

In some embodiments, process 1000 returns to step 1002 after performing step 1010. For example, the samples of the signal affected by the disturbance generated in step 1010 can be evaluated in step 1002 to estimate the response time of plant 804. Process 1000 can be repeated iteratively to update the estimated response time, adjust the operating parameters, and provide updated control signals to plant 804 based on the adjusted operating parameters.

Figure 11:
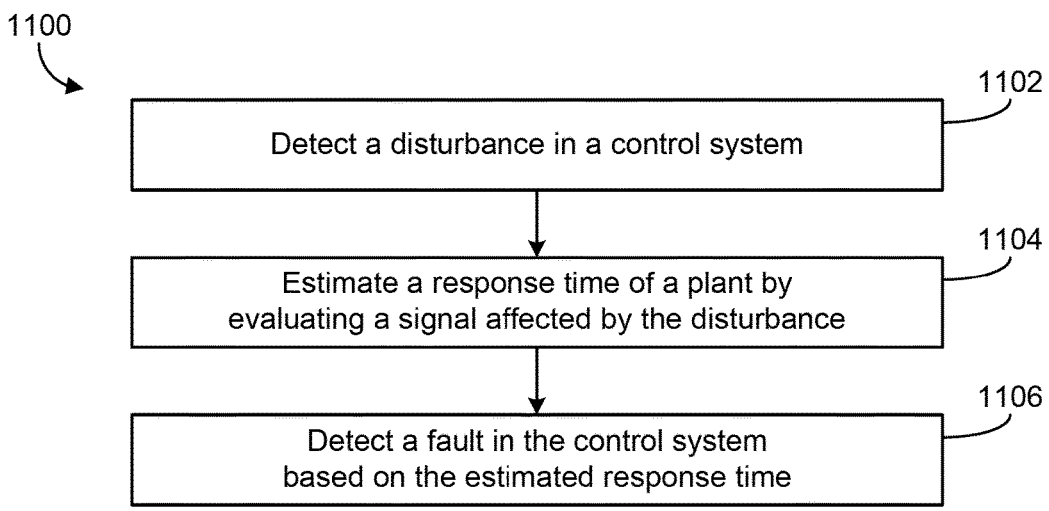
FIG. 11 is a flowchart of a process for detecting faults in a control system, according to an exemplary embodiment.

Referring now to FIG. 11, a flowchart of a process 1100 for detecting faults in a control system is shown, according to an exemplary embodiment. Process 1100 can be performed by one or more components of control system 800, as described with reference to FIG. 8.

Process 1100 is shown to include detecting a disturbance in a control system (step 1102). In some embodiments, step 1102 is performed by disturbance detector 844. Step 1102 may include detecting a setpoint change or a load disturbance by monitoring a signal affected by the disturbance. In some embodiments, step 1102 includes detecting the disturbance using a status indicator or signal received from adaptive controller 850. For example, controller 850 may output a signal indicating whether control system 800 is subject to a setpoint change or a load disturbance. In some embodiments, the disturbance includes a user input (e.g., a user-specified setpoint change) and step 1102 includes detecting the disturbance by monitoring the user input.

In some embodiments, step 1102 includes detecting the disturbance by analyzing the error signal e in a feedback control system. For example, a setpoint change may result in an instantaneous change in the error signal e whereas a load disturbance may result in continuous increase in the magnitude of the error signal e. In non-feedback control systems, step 1102 can include detecting the disturbance by monitoring a control signal provided to plant 804, a feed-forward signal (e.g., received from a feed-forward estimator), a sensor signal (e.g., from a sensor monitoring a variable other than the controlled variable), or any other type of signal (e.g., calculated or measured) communicated between one or more components of control system 800.

Process 1100 is shown to include estimating a response time of a plant by evaluating a signal affected by the disturbance (step 1104). In some embodiments, step 1104 is performed by response time estimator 846. The response time of the plant 804 is a parameter that characterizes the response of plant 804 to the disturbance. For example, the response time of plant 804 can be the time constant $\tau_p$ (as previously described), a dominant time constant of plant 804, a bandwidth of plant 804, an open loop response time, or any other parameter that characterizes the time response of plant 804 to a disturbance. In some embodiments, step 1104 is performed in response to a detected disturbance in control system 800 (e.g., in response to step 1102).

In some embodiments, step 1104 includes determining whether the control system is subject to a setpoint change or a load disturbance (e.g., by receiving a signal from adaptive controller 850, by analyzing the signal affected by the disturbance, etc.). If the system is subject to a setpoint change, step 1104 may include estimating the response time by integrating the signal affected by the disturbance. For example, step 1104 can include determining an area under a curve defined by the signal affected by the disturbance. Step 1104 can include dividing the area under the curve by the magnitude of the setpoint change to determine the estimated response time.

If the system is subject to a load disturbance, step 1104 can include estimating the response time by determining a time at which the signal affected by the disturbance reaches an extremum (e.g., a minimum or a maximum) in response to the load disturbance. Step 1104 can include subtracting the time value at which the load disturbance begins from the time value at which the signal reaches an extremum to determine the estimated response time. Step 1104 can include monitoring the signal affected by the disturbance for threshold value crossings (e.g., a sign change from positive to negative or negative to positive) to determine the time at which a load disturbance begins.

Process 1100 is shown to include detecting a fault in the control system based on the estimated response time (step 1106). In some embodiments, step 1106 is performed by fault detector 852. The response time of plant 804 may be expected to remain relatively constant in the absence of a fault. A significant change in the response time may indicate that a fault has occurred. For example, faulty building equipment may cause plant 804 to react more slowly to a disturbance, which can result in a longer response time.

Step 1106 may include using a history of response times for plant 804 (from response time database 854) to detect faults in control system 800. For example, step 1106 may include comparing the current response time generated in step 1104 with a previous response time from response time database 854. If the current response time is significantly different from the previous response time, step 1106 may include determining that a fault has occurred. In some embodiments, step 1106 includes calculating a difference between the current response time and the previous response time and comparing the difference with a threshold value. If the difference exceeds the threshold value, step 1106 may include determining that a fault has occurred. In some embodiments, step 1106 includes calculating a ratio of the current response time to the previous response time. If the ratio is less than a minimum threshold value or greater than a maximum threshold value, step 1106 may include determining that a fault has occurred.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system for a plant, the control system comprising:
    a controller configured to estimate a response time of the plant and adjust a sampling rate based on the estimated response time, wherein the response time is a parameter that characterizes a response of the plant to a disturbance; and
    a sensor configured to receive the adjusted sampling rate from the controller, collect samples of a measured variable from the plant at the adjusted sampling rate, and provide the samples of the measured variable to the controller;
    wherein the controller is configured to detect the disturbance in the control system, evaluate a signal affected by the disturbance to estimate the response time of the plant, classify the disturbance as either a setpoint change or a load disturbance and, if the disturbance is classified as a setpoint change, the controller is configured to estimate the response time by:
        identifying a portion of the signal affected by the disturbance;
        tracking an area bounded by the identified portion of the signal; and
        dividing the area bounded by the identified portion of the signal by a magnitude of the setpoint change to determine the estimated response time.

2. The control system of claim 1, wherein the controller is configured to use the samples of the measured variable to generate and provide an input to the plant.

3. The control system of claim 1, wherein the controller is configured to use the adjusted sampling rate to generate samples of the signal affected by the disturbance.

4. The control system of claim 1, wherein the signal affected by the disturbance comprises at least one of the measured variable and a function of the measured variable.

5. The control system of claim 1, wherein the signal affected by the disturbance comprises at least one of an input provided to the plant and a function of the input provided to the plant.

6. The control system of claim 1, wherein the response time comprises at least one of a dominant time constant, a bandwidth, and an open loop response time of the plant.

7. A method for monitoring and controlling a plant, the method comprising:
receiving, at a controller for the plant, a signal affected by a disturbance in a control system for the plant;
classifying the disturbance as either a setpoint change or a load disturbance;
evaluating the signal affected by the disturbance to estimate a response time of the plant, wherein the response time is a parameter that characterizes a response of the plant to the disturbance and, if the disturbance is classified as a setpoint change, estimating the response time comprises:
identifying a portion of the signal affected by the disturbance,
tracking an area bounded by the identified portion of the signal; and
dividing the area bounded by the identified portion of the signal by a magnitude of the setpoint change to determine the estimated response time;
adjusting a sampling rate based on the estimated response time;
providing the adjusted sampling rate from the controller to a sensor;
using the sensor to collect samples of a measured variable from the plant at the adjusted sampling rate; and
using the samples of the measured variable to generate and provide an input to the plant.

8. The method of claim 7, further comprising detecting the disturbance in the control system for the plant;
wherein the signal affected by the disturbance is evaluated in response to detecting the disturbance.

9. The method of claim 7, further comprising using the adjusted sampling rate to generate samples of the signal affected by the disturbance.

10. The method of claim 7, wherein the signal affected by the disturbance comprises at least one of the measured variable and a function of the measured variable.

11. The method of claim 7, wherein the signal affected by the disturbance comprises at least one of the input provided to the plant and a function of the input provided to the plant.

12. The method of claim 7, wherein the response time comprises at least one of a dominant time constant, a bandwidth, and an open loop response time of the plant.

13. A control system for a plant, the control system comprising:
a disturbance detector configured to detect a disturbance in the control system and classify the disturbance as either a setpoint change or a load disturbance;
a response time estimator configured to evaluate a signal affected by the disturbance to estimate a response time of a plant, wherein the response time is a parameter that characterizes a response of the plant to the disturbance and, if the disturbance is classified as a setpoint change, the response time estimator is configured to estimate the response time by:
identifying a portion of the signal affected by the disturbance;
tracking an area bounded by the identified portion of the signal; and
dividing the area bounded by the identified portion of the signal by a magnitude of the setpoint change to determine the estimate response time;
a fault detector configured to detect a fault in the control system based on the estimated response time of the plant; and
an adaptive controller configured to generate and provide an input to the plant.

14. The control system of claim 13, wherein the fault detector is configured to detect the fault by:
comparing the estimated response time to a previous response time for the plant; and
determining that a fault has occurred in response to the estimated response time deviating from the previous response time by a predetermined amount.

15. The control system of claim 13, further comprising an operating parameter calculator configured to adjust an operating parameter used by the adaptive controller based on the estimated response time.

16. The control system of claim 15, wherein the adjusted operating parameter comprises at least one of a controller gain and an integral time.

17. The control system of claim 13, further comprising a sampling rate adjustor configured to adjust a sampling rate based on the estimated response time.

18. The control system of claim 17, further comprising a sensor configured to:
collect samples of a measured variable from the plant at the adjusted sampling rate; and
provide the samples of the measured variable to the adaptive controller.

19. The control system of claim 13, wherein the response time comprises at least one of a dominant time constant, a bandwidth, and an open loop response time of the plant.

* * * * *